United States Patent [19]

Ogawa et al.

[11] Patent Number: 4,941,070
[45] Date of Patent: Jul. 10, 1990

[54] FLASH DEVICE FOR A CAMERA

[75] Inventors: Yukio Ogawa; Kazuo Ikawa, both of Kanagawa; Toru Shoji, Tokyo; Hideo Tamamura, Kanagawa; Hiroki Nakayama, Kanagawa; Takashi Matsushita, Kanagawa, all of Japan

[73] Assignee: Canon Kabushiki Kaisha, Tokyo, Japan

[21] Appl. No.: 331,013

[22] Filed: Mar. 30, 1989

[30] Foreign Application Priority Data

| Aug. 13, 1986 | [JP] | Japan | 61-190037 |
| Aug. 18, 1986 | [JP] | Japan | 61-192584 |
| Aug. 18, 1986 | [JP] | Japan | 61-192585 |
| Oct. 3, 1986 | [JP] | Japan | 61-236843 |
| Oct. 9, 1986 | [JP] | Japan | 61-240719 |
| Oct. 9, 1986 | [JP] | Japan | 61-240720 |
| Oct. 9, 1986 | [JP] | Japan | 61-240721 |
| Oct. 9, 1986 | [JP] | Japan | 61-240722 |
| Oct. 14, 1986 | [JP] | Japan | 61-157478 |
| Dec. 16, 1986 | [JP] | Japan | 61-194285 |
| Dec. 17, 1986 | [JP] | Japan | 61-194082 |
| Feb. 23, 1987 | [JP] | Japan | 62-040652 |
| Apr. 10, 1987 | [JP] | Japan | 62-088101 |
| Apr. 16, 1987 | [JP] | Japan | 62-094889 |
| May 2, 1987 | [JP] | Japan | 62-109175 |
| Jun. 1, 1987 | [JP] | Japan | 62-138801 |

[51] Int. Cl.$^5$ .......................... G03B 15/02; F21V 7/00
[52] U.S. Cl. ........................ 362/3; 362/263; 362/309; 362/339; 354/149.1; 313/594; 313/610
[58] Field of Search ........... 362/3, 4, 18, 306, 369, 362/390, 263, 16, 309, 329, 339; 313/493, 610, 25, 113, 594; 354/126, 149.1, 149.11

[56] References Cited

U.S. PATENT DOCUMENTS

| 2,860,233 | 11/1958 | Johnson, Jr. | 362/369 |
| 3,903,447 | 9/1975 | Young et al. | 313/493 |
| 4,196,374 | 4/1980 | Ogawa et al. | 315/58 |
| 4,282,565 | 8/1981 | Hanson et al. | 362/306 |
| 4,423,940 | 1/1984 | Kashihara et al. | 362/18 |
| 4,475,058 | 10/1984 | Takeda et al. | 313/610 |

FOREIGN PATENT DOCUMENTS

| 906947 | 2/1946 | France | 313/610 |
| 273533 | 2/1951 | Switzerland | 313/610 |
| 407565 | 3/1934 | United Kingdom . | |
| 1156859 | 7/1969 | United Kingdom . | |
| 2016204A | 9/1979 | United Kingdom . | |
| 2029086A | 3/1980 | United Kingdom . | |
| 2029087A | 3/1980 | United Kingdom . | |
| 2151072A | 7/1985 | United Kingdom . | |

OTHER PUBLICATIONS

Amglo Flashtube Engineering Manual Amglo Corp. pp. 11, 12, 1977.

Primary Examiner—Noah P. Kamen
Attorney, Agent, or Firm—Fitzpatrick, Cella, Harper & Scinto

[57] ABSTRACT

A flash device for a camera of the kind using a miniature lamp type flash tube solves all the problems resulting from the use of the straight tube type flash tube. The disclosed arrangement of the flash device not only ensures an adequate light distributing characteristic in all the vertical and lateral directions but also permits reduction in size of an electronic flash unit.

25 Claims, 38 Drawing Sheets

FIG.14(a)   FIG.14(b)
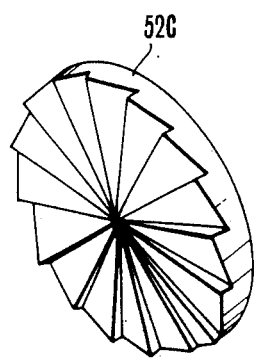 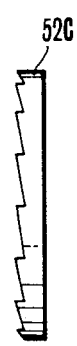
FIG.15(a)   FIG.15(b)
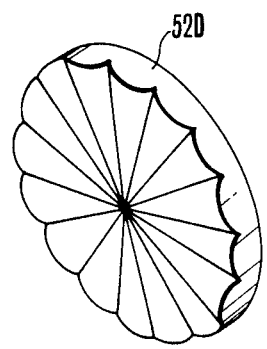 

4,941,070

FLASH DEVICE FOR A CAMERA

This application is a continuation of application Ser. No. 084,106 filed Aug. 11, 1987 which is now abandoned.

BACKGROUND OF THE INVENTION

1. Field of the Invention

This invention relates to the structural arrangement of a very compact flash device for a camera.

2. Description of the Related Art

The conventional electronic flash unit has been arranged as follows: A flash discharge tube which is formed with a rare gas such as xenon sealed in a glass tube of a circular sectional shape. Cathode and anode electrodes are disposed at two ends of a cylindrical straight glass tube. A transparent conductive coat mainly consisting of tin oxide is applied to the peripheral surface of the straight glass tube at a part between the fore ends of the anode and cathode electrodes disposed within the glass tube to form a trigger electrode. The trigger electrode has a lead wire which is formed by winding a fine nickel wire or the like round the part of the glass tube where the transparent conductive coat is applied.

In arranging the the above stated flash tube in an electronic flash unit, the flash tube is provided with a reflector for efficient irradiation within a given range. The reflector is formed into a concave shape approximately having a surface of revolution at least relative to the optical axis of the flash tube. The flash tube is located either at or in the neighborhood of the focal point within the flash tube.

The body of the reflector within which the flash tube is disposed is made of either a synthetic resin material with aluminum applied to the surface thereof by vacuum evaporation or a brightening aluminum alloy plate with its surface specularly finished. The reflector is in a shape consisting of a pair of reflecting planes on its longer sides extending in parallel to the flash tube and a pair of reflection planes extending on its shorter sides perpendicularly to the flash tube. With the reflector arranged in this manner, however, the illuminating light distribution characteristic of the reflection plane on the shorter side is inferior to that of the reflection plane on the longer side. In other words, the light utilization rate (or yield) of the flash device is inadequate. To solve this problem, there has been known a method in which the shape of the reflector is changed to increase the front width and to deepen the depth thereof. However, this method has resulted in an increased size of the electronic flash unit.

SUMMARY OF THE INVENTION

This invention is directed to the solution of the problems of the prior art described. It is therefore an object of the invention to provide a flash device for a camera using a miniature-lamp type flash tube which is capable of eliminating all the problems resulting from the use of the straight-tube type flash tube and not only permits reduction in size of the flash device but also ensures an adequate light distribution characteristic in all the vertical and lateral directions.

The above and other objects and features of the invention will become apparent from the following detailed description of embodiments thereof taken in connection with the accompanying drawings.

BRIEF DESCRIPTION OF THE DRAWINGS

FIGS. 14(a), 14(b), 15(a), 15(b), 16(a), 16(b), 17(a) and 17(b) are oblique views respectively showing protectors included in further embodiments of this invention.

35 is an oblique view showing a trigger line shown in FIG. 33.

DETAILED DESCRIPTION OF THE PREFERRED EMBODIMENT

Figure 1:
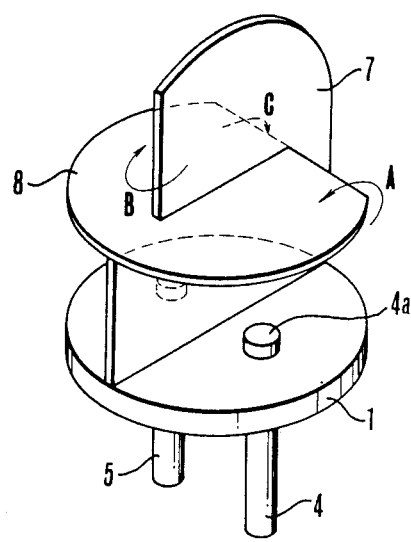
FIG. 1 is an oblique view showing a miniature lamp type electronic flash tube arranged as an embodiment of this invention.
Figure 2A:
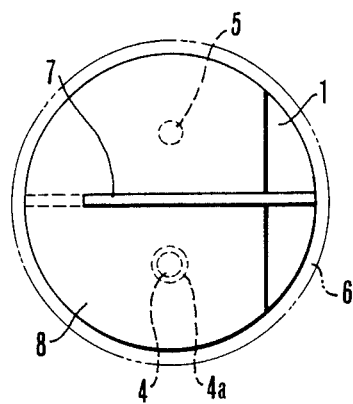
FIGS. 2(a) and 2(b) are a top plan view and a front view of the flash tube of FIG. 1.
Figure 2B:
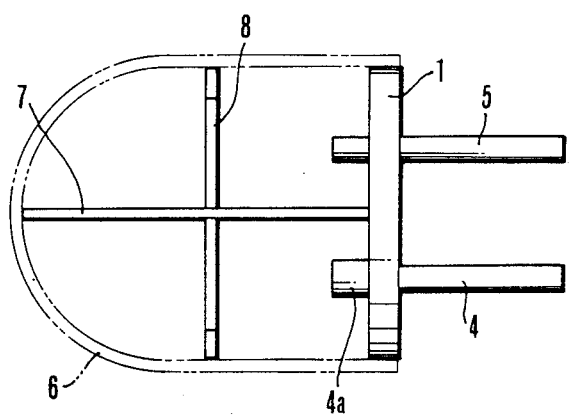

Embodiments of this invention are described below with reference to the accompanying drawings: FIG. 1 shows in an oblique view a miniature lamp type flash tube arranged according to this invention as an embodiment thereof. FIG. 2(a) shows it in a top plan view and FIG. 2(b) in a front view.

Referring to FIGS. 1 and 2, a circular bottom plate 1 is made of a ceramic material and is encompassed with a glass tube 6 which has its fore end formed into a spherical shape as indicated by two-dot chain lines. Shield plates 7 and 8 are made of a ceramic or glass material or the like. The shield plate 8 is in a circular shape with a cut-away part. The plate 8 is disposed in parallel with the bottom plate 1 at a given distance from the latter. The other shield plate 7 is disposed perpendicularly to the bottom plate 1 approximately in the middle part of the latter. The shield plates 7 and 8 are thus combined in such a way as to divide the space within the glass tube 6 into four chambers.

Cathode and anode electrodes 4 and 5 pierce through the bottom plate 1. The cathode electrode 4 has a sintered electrode 4a located on the inner side of the glass tube 6. Further, a transparent conductive coat which mainly comprises tin oxide is applied to the outer circumferential surface of the glass tube 6. This coat serves as a trigger electrode. A rare gas such as xenon is sealed within the glass tube 6.

With the flash tube arranged in this manner, when a high voltage is applied between the cathode and anode electrodes 4 and 5 and, at the same time, a ringing voltage is applied to the trigger electrode, arc discharge takes place to effect flashing with electrons discharged via a route denoted by arrows A, B and C in FIG. 1.

In this instance, since the arc discharge route connects the cathode and anode electrodes 4 and 5 to each other via the four chambers as mentioned above, the arc length can be made to be about the same as the arc length obtainable by the conventional straight tube type flash device. Therefore, about the same flashing efficiency as the conventional device is attainable despite of the small size of the flash tube which is made possible by the invented arrangement. In addition to that, the spherical (or semi-spherical) fore end shape of the glass tube 6 enables the electronic flash unit to give a uniform light distribution in conjunction with a circularly opening reflector.

Figure 3:
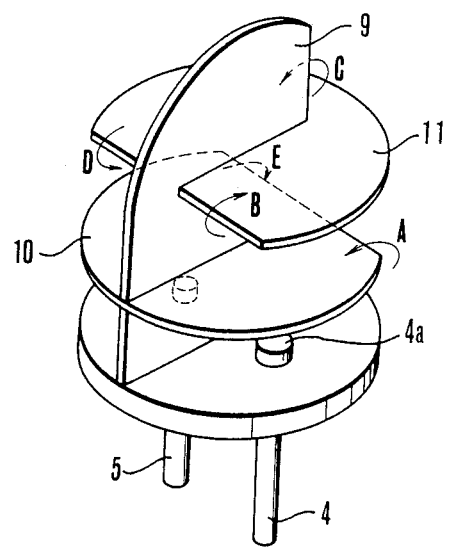
FIG. 3 is an oblique view showing another miniature lamp type flash tube arranged as another embodiment of the invention.

FIG. 3 shows in an oblique view a miniature lamp type flash tube which is arranged according to this invention as another embodiment thereof. In FIG. 3, the parts that are the same as those shown in FIGS. 1 and 2 are indicated by the same reference numerals and the details of them are omitted from the following description:

This embodiment differs from the foregoing example of embodiment in the following point: There are provided two horizontal shield plates, instead of one, for the purpose of obtaining a further increased arc length. More specifically, while a first shield plate 9 is vertically disposed, second and third shield plates 10 and 11 extend perpendicular to the first shield plate 9. Each of the second and third shield plates 10 and 11 has a peripheral cutaway part in its circular shape. These plates 10 and 11 are arranged in combination in such a way as to have their cutaway parts located on opposite sides. The first shield plate 9 is formed into an R-shape having its fore end shaped to extend along the inner wall of the glass tube 6 and to have also a cutaway part.

With the shield plates arranged in this manner, the inside of the glass tube 6 is divided into six chambers. The electrons discharged from the cathode electrode 4 come to the anode electrode 5 via a route including the directions of arrows A, B, C, D and E. The arc length in this case is longer than that of the embodiment shown in FIG. 1.

The second example of embodiment shown in FIG. 3 thus has a longer arc length, i.e. a greater distance between the cathode and anode electrodes, by increasing the number of chambers within the glass tube with the horizontal and vertical shield plates arranged as mentioned in the foregoing. The terminals of these electrodes are symmetrically disposed relative to the axis of the glass tube. This arrangement not only permits reduction in size of the flash tube but also enables the electrode terminals to be set in such a position that greatly facilitates mounting and assembling work on the flash tube. It is another advantage of the embodiment that the anode and cathode terminals can be more easily isolated to a sufficient extent away from each other than in the case of the conventional device.

Further, it goes without saying that, in accordance with this invention, the number of horizontal shield plates can be further increased on the same concept for attaining the same advantageous effects of this embodiment. The same effects is also attainable by obliquely arranging the horizontal and vertical shield plates relative to the bottom plate for dividing the inside of the glass tube. It is also possible to divide the inside of the glass tube into a greater number of chambers by replacing the single vertical shield plate with a plurality of vertical shield plates. Further, while a part of each of the parallel (or horizontal) shield plates is cut away, they may be replaced with circular shield plates each of which has some aperture suitably arranged therein instead of the cutaway part.

Figure 4:
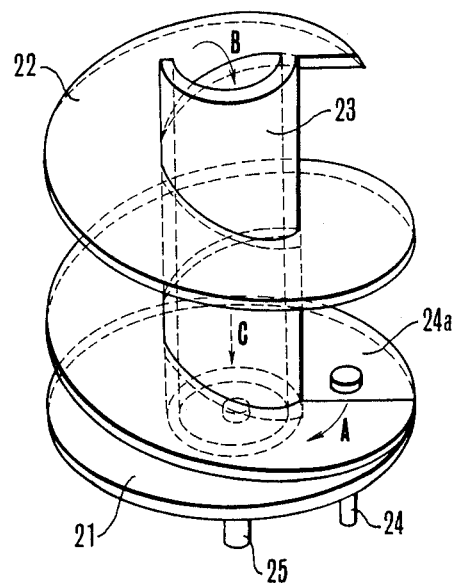
FIG. 4 is an oblique view showing a miniature lamp type flash tube arranged as a further embodiment of this invention.
Figure 5A:
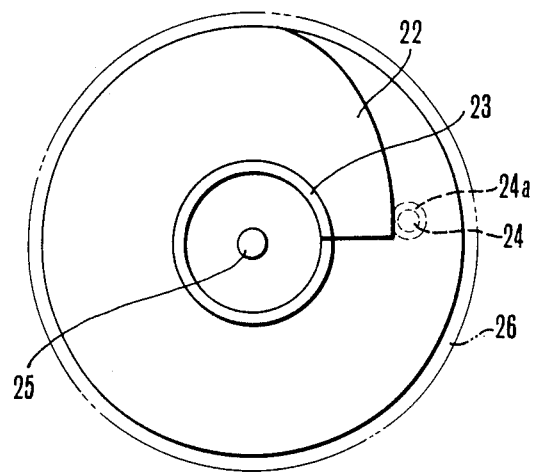
FIGS. 5(a) and 5(b) are a top plan view and a front view showing the flash tube of FIG. 4.
Figure 5B:
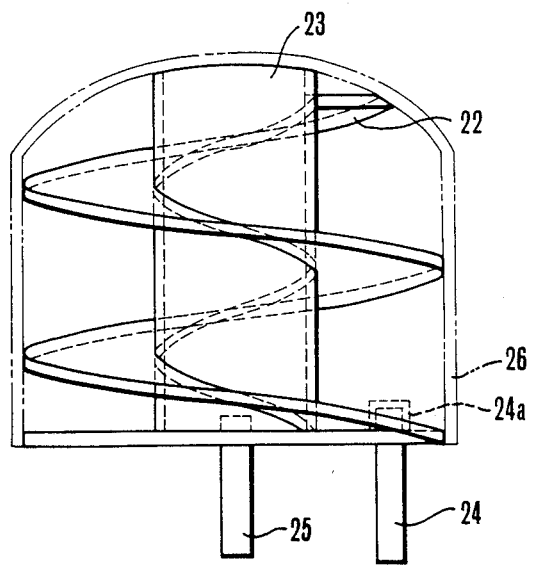

FIG. 4 shows in an oblique view a miniature lamp type flash tube arranged according to this invention as a further embodiment thereof. FIGS. 5(a) and 5(b) show it in a top plan view and a front view respectively.

Referring to these drawings, a circular bottom plate 21 is made of a ceramic material. The periphery of the bottom plate 21 is encompassed with a glass tube 26 which has its fore end formed into a spherical shape as indicated by two-dot chain lines. Shield plates 22 and 23 are formed with a ceramic or glass material. The shield plate 22 is in a helicoidal shape. The shield plate 23 is in a cylindrical shape and is perpendicularly disposed in the middle part of the bottom plate 21. The upper part of the shield plate 23 is connected to a void space defined by the shield plate 22. The edge faces of the shield plates 22 and 23 are in close contact with the inner wall of the glass tube 26 to form a series of void spaces between electrodes 24 and 25. The series of void spaces thus give a desired arc length.

The cathode and anode electrodes 24 and 25 pierce through the bottom plate 21. The sintered electrode 24a of the cathode electrode 24 is disposed on the inner side of the glass tube 26. The outer circumferential surface of the glass tube 26 is coated with a transparent conductive film which principally consists of tin oxide and is arranged to serve as a trigger electrode. A rare gas like xenon is sealed within the glass tube 26. When a high voltage is applied to the flash tube between the cathode and anode electrodes 24 and 25 and, at the same time, a trigger voltage is applied to the trigger electrode, electrons are discharged through a route as indicated by arrows A, B and C in the drawing. The flash tube then flashes. While the element 24 is arranged to serve as a cathode electrode and the element 25 as an anode electrode in this case, they may be conversely arranged.

Figure 6:
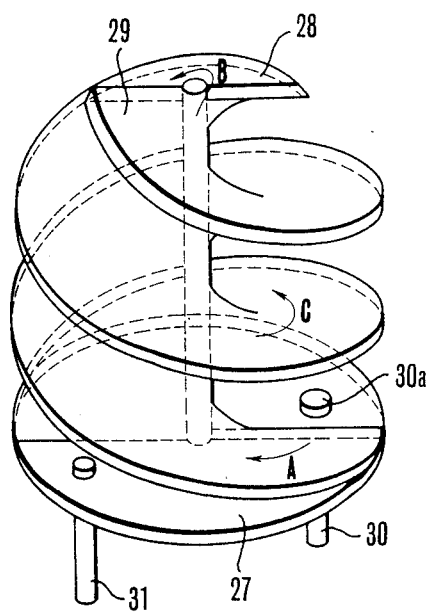
FIG. 6 is an oblique view showing a miniature lamp type flash tube arranged as a further embodiment of this invention.
Figure 7A:
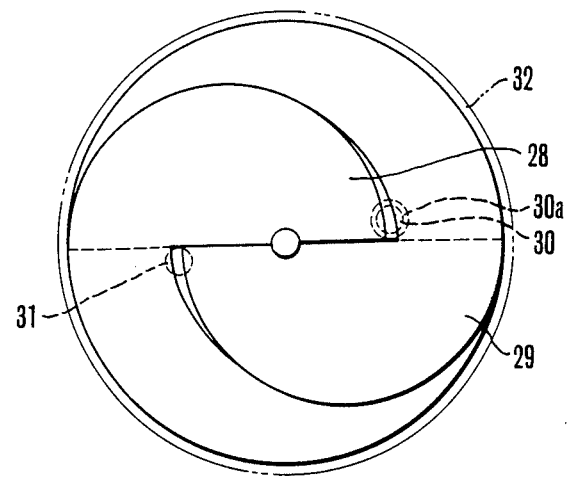
FIGS. 7(a) and 7(b) are a top plan view and a front view of the flash tube of FIG. 6.
Figure 7B:
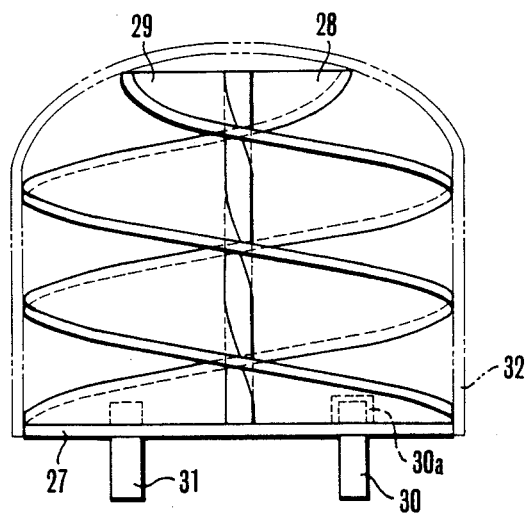

FIG. 6 is an oblique view showing a miniature lamp type flash tube arranged as a further embodiment of this invention. FIGS. 7(a) and 7(b) are the top plan and front views of the embodiment shown in FIG. 6. In these drawings, all the parts that are arranged in the same manner as those of FIGS. 4 and 5 are indicated by the same reference numerals and the details of them are omitted from the following description:

Referring to FIGS. 6 and 7, a circular bottom plate 27 is made of, for example, a ceramic material. The bottom plate 27 is encompassed with a glass tube 32 which has its fore end formed into a spherical shape as shown by two-dot chain lines in FIG. 7(a) and 7(b).

Shield plates 28 and 29 are formed with a ceramic or glass material in a double helicoidal shape. The upper ends of these shield plates are connected to the glass tube 32 to define a series of void spaces between electrodes 30 and 31, so that a desired arc length is obtained. An arc discharge is effected through a route as indicated by arrows A, B and C to emit flash in the same manner as in the embodiment of FIG. 4.

Figure 8:
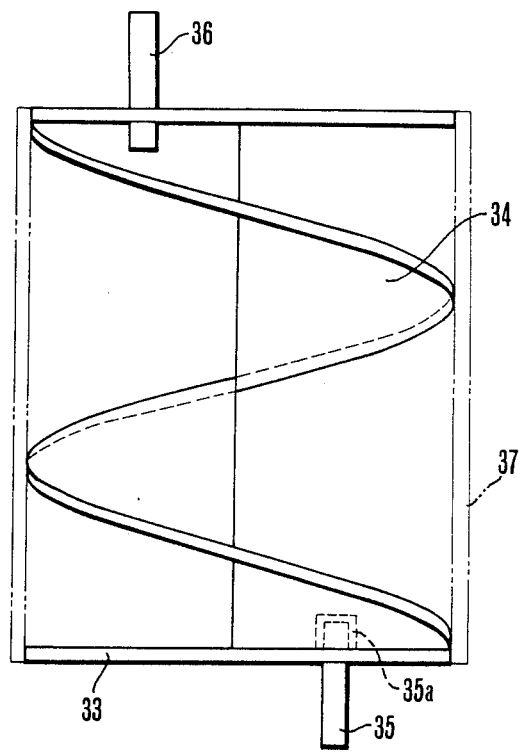
FIG. 8 is a front view showing a flash tube arranged according to this invention as a further embodiment thereof.

FIG. 8 is a front view showing a discharge tube of the straight type to which a helicoid structure of the invention is applied. Similar to the embodiments shown in FIGS. 4 and 6, a series of spaces between electrodes 35 and 36 is formed by a shield plate 34 made of, for example, ceramic and a glass tube 37. Accordingly, a desired arc length can be obtained despite the use of shorter glass tube than the conventional straight type glass tube.

In the cases of embodiments shown in FIGS. 4 to 8, helicoidal shield plates are arranged in close contact with the inner wall of the glass tube to form an arc discharge passage which lengthens the arc length. This arrangement enables the flash tube to have a sufficiently long arc length for the same degree of flashing efficiency as the conventional straight tube type flash tube despite the compact size thereof.

Meanwhile, however, the shield plate arrangement of the above stated embodiments might introduce some shadow in the illuminating light. Such a shadow would make an even light distributing characteristic impossible and tends to result in a seriously degraded picture quality. Therefore, further embodiments of the invention are arranged to solve this problem as shown in FIGS. 9 to 18.

Figure 9:
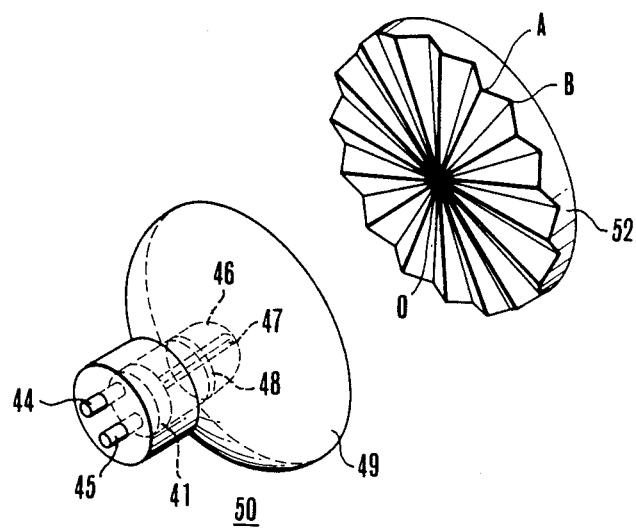
FIG. 9 is an exploded view showing the essential members of the flashing part of an electronic flash unit arranged as a further embodiment of this invention.

FIG. 9 shows in an exploded view the essential members of the light emitting part of one of such further embodiments of this invention. Referring to FIG. 9, a circular bottom plate 41 is made of, for example, a ceramic material. The bottom plate 41 is encompassed with a glass tube 46 which has a spherically formed fore end as indicated by a broken line and is arranged to serve as a gas sealing body. Shield plates 47 and 48 are formed with a ceramic or glass material. The shield plate 48 is in a partly cutaway circular shape and is disposed at a given distance from and in parallel to the bottom plate 41. The other shield plate 47 is perpendicularly disposed in the middle part of the bottom plate 41. The inside of the glass tube 46 is divided into four chambers by the combined arrangement of the shield plates 47 and 48 like in the case of the embodiment shown in FIG. 1.

Cathode and anode electrodes 44 and 45 pierce through the bottom plate 41. The cathode electrode 44 has its sintered electrode disposed on the inner side of the glass tube 46. To the outer circumferential surface of the glass tube 46 is applied a transparent conductive coat which mainly comprises tin oxide and is arranged to serve as a trigger electrode. A rare gas such as xenon is sealed in the above stated glass tube 46.

With the flash tube 50 arranged in this manner, when a high voltage is applied thereto between the cathode and anode electrodes 44 and 45 with a ringing voltage also applied to the trigger electrode at the same time, electrons are discharged within the glass tube 46 through a route as indicated by arrows A, B and C in FIG. 1. Then, there takes place an arc discharge for flashing.

Figure 10:
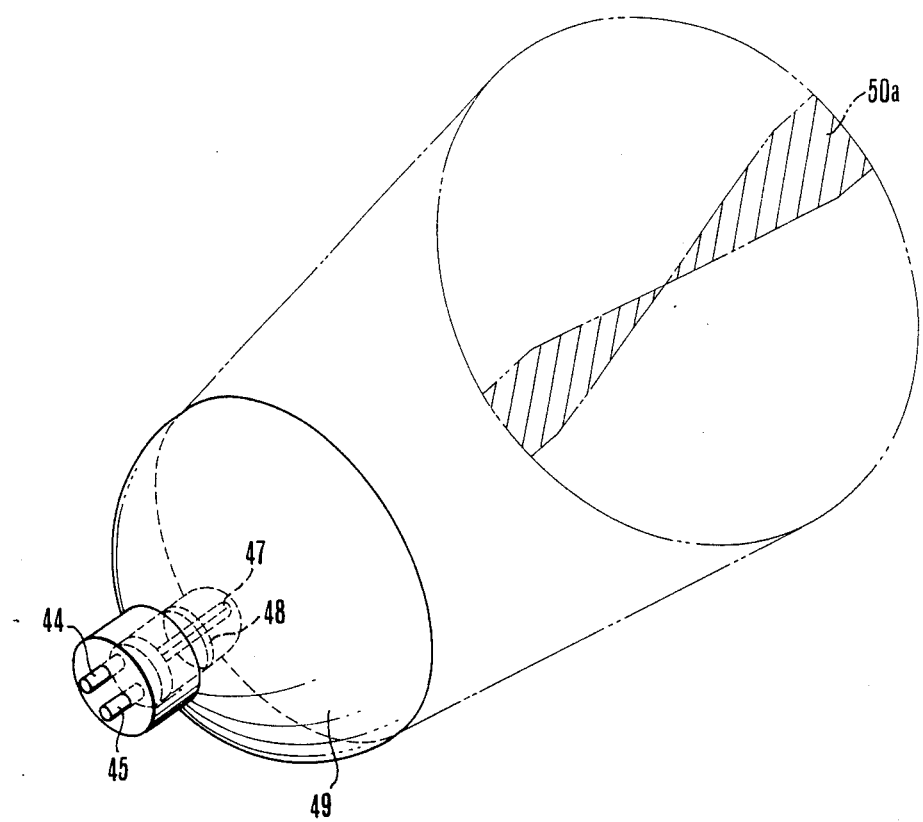
FIG. 10 shows the light distribution characteristic of a flash tube of this invention.
Figure 11:
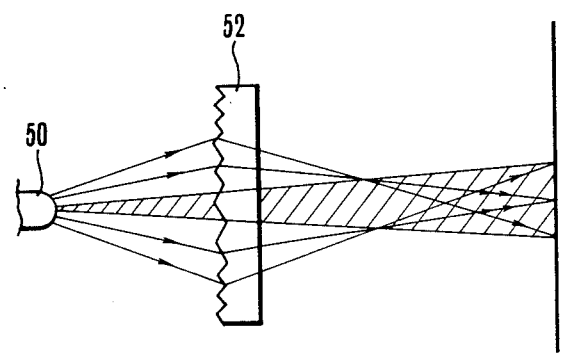
FIG. 11 shows the characteristic of a protector included in the flashing part of the flash unit of FIG. 9.
Figures 12A, 12B:
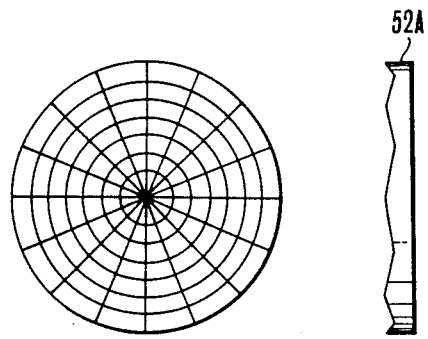
FIGS. 12(a), 12(b) and 13(a), 13(b), 13(c) are front views, side views and a rear view showing a protector included in an electronic flash unit arranged according to this invention as a further embodiment thereof.
Figures 13A, 13B, 13C:
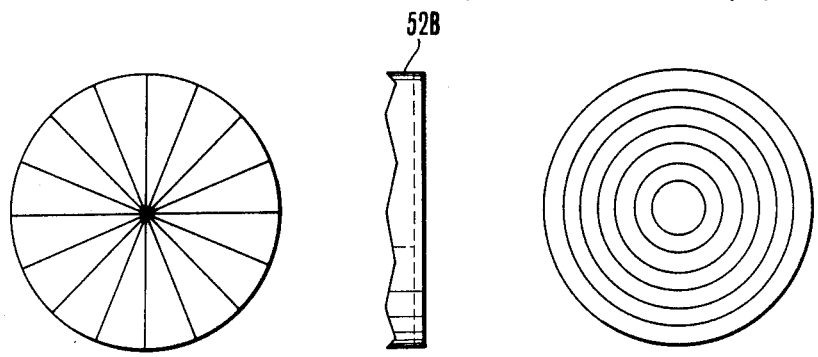
Figure 16A:
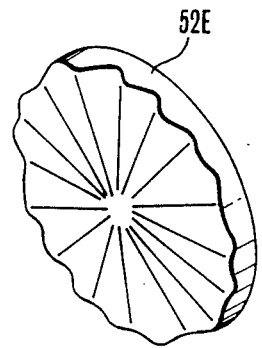
Figure 16B:
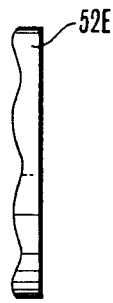

A circular reflector 49 is secured to the bottom part of the flash tube 50. A light transmissive protector 52 is disposed in front of the circular reflector 49. A triangle OAB which is formed by the center 0 of the protector 52 and two points A and B on the circumference of the protector 52 defines a plane at an angle to a plane perpendicular to the optical axis of the protector 52. This arrangement of the protector 52 advantageously deflects the rays of light from the flash tube 50 in peripheral directions relative to the optical axis of the flash tube. This effectively eliminates the unevenness of light distribution by applying the rays of light also to such parts where some shadow 50a that would be produced by the shield plate 47 arranged as shown in FIG. 10. More specifically, the protector 52 is arranged to deflect the light of a part which is unaffected by the shield plate 47 disposed within the flash tube 50 toward a part affected by the shield plate 47 and hatched in FIG. 11 in such a way as to eliminate the unevenness of light distribution. Further, with the protector 52 arranged to deflect only in the peripheral directions, the embodiment is capable of removing the shadow in question without any adverse effect on the angle of light distribution of the flash unit. Further, with the protector 52 arranged to give such an advantageous effect that is attainable by a Fresnel lens which is generally used for control over light distribution, the light distribution control and the removal of the adverse effect of the shield plate can be simultaneously accomplished. For that purpose, a protector 52A may be arranged either to have one side thereof facing the flash tube 50 formed to give both of the above stated two effects as shown in FIGS. 12(a) and 12(b), or a protector 52B or to have one side thereof facing the flash tube 50 formed to deflect the rays of light in the peripheral directions shown in FIG. 9 and the other side thereof facing an illuminating object formed to give the effect of the Fresnel lens, as shown in FIGS. 13(a), 13(b) and 13(c).

The electronic flash unit which is arranged as an embodiment of this invention in the above stated manner further comprises, for example, a trigger circuit which triggers the flash tube 50, a booster circuit, a flash light amount control circuit, an illumination angle control circuit, etc. which are all arranged in a known manner. Therefore, the details of these circuits are omitted from the following description.

FIGS. 14 to 18 show embodiments of this invention differing from the above stated embodiment of FIG. 9. While the protector 52 shown in FIG. 9 has its edge face formed in a triangular wave shape, this shape may be changed to one of varied shapes for attaining the same effect. For example, it may be changed to a sawtooth wave shape 52c as shown in FIGS. 14(a) and 14(b), to an arcuate wave shape 52D as shown in FIGS. 15(a) and 15(b) or to a sine wave shape 52E as shown in FIG. 16(a) and 16(b). The surface of the protector may be a glossy surface. However, depending on the purpose of application, the surface can be arranged to be light diffusive to a certain degree for attaining the same advantageous effect without causing a loss in light quantity.

Figure 17A:
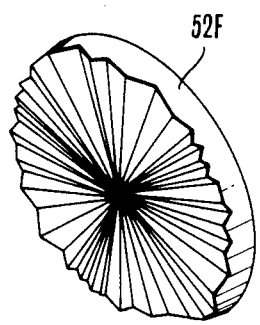
Figure 17B:
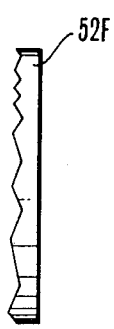

Further, the protector does not have to be in an unvarying surface shape allover from its peripheral area to the center thereof. The shape may be changed halfway in such a manner as to have the shapes of the protectors 52 to 52E mixed together as shown in FIGS. 17(a) and 17(b). The object of this invention for adequate light distribution is also attainable by such modifications. In short, the object of this invention is attainable as long as some part of the protector is shaped in such a way as to deflect the rays of light from the flash tube 50 in the peripheral or circumferential directions.

Figure 18:
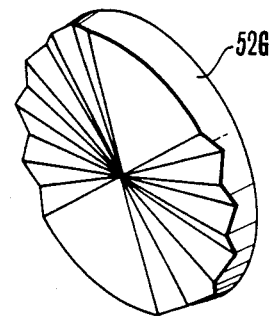
FIG. 18 is an oblique view showing a protector included in an electronic flash unit arranged as a further embodiment of this invention.

Further, a desired light distribution characteristic is also obtainable by forming some parts of a protector 52, as shown in FIG. 18, in such a shape as to deflect the rays of light from the flash tube 50 in the directions of its periphery or circumference while the rest of the protector 52G is in a flat shape or in a shape like a Fresnel lens.

The foregoing description is given on the assumption that the inside of the flash tube 50 is arranged in the same manner as shown in FIG. 1. However, the flash tube of these embodiments are not limited to that specific structural arrangement but may be arranged in the same manner as in any of other preceding embodiment examples described in the foregoing.

In the embodiments shown in FIGS. 9 to 18, the parts of the protector which correspond to the shadow forming parts of the shield plate of the flash tube are arranged to deflect the rays of light from the flash tube in the directions of circumference thereof. The protector thus ensures fairly uniform light distribution characteristic of the flash unit even in the event of such a flash tube that produces some shadow. These embodiments thus ensure effective utilization of light.

Other embodiments of this invention are arranged to be capable of preventing any shadow from being brought about by the shield plate and enhancing the rate of light utilization without having recourse to the above stated protector. The examples of such embodiments are as shown in FIGS. 19 to 25.

Figure 19:
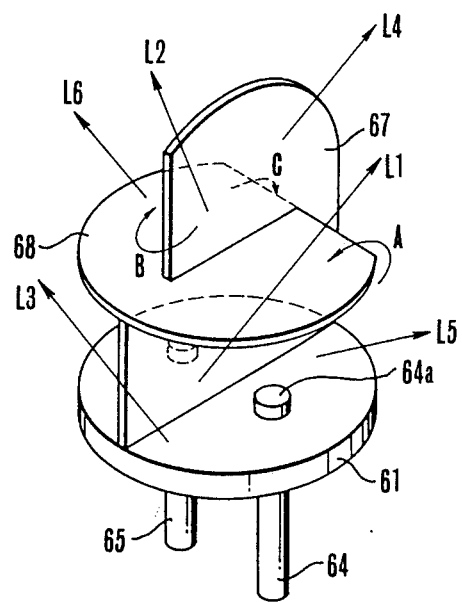
FIG. 19 is an oblique view showing a flash tube of a further embodiment of this invention.
Figure 20A:
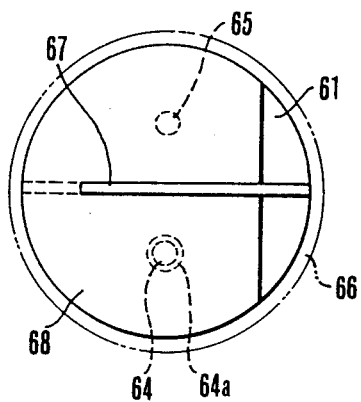
FIGS. 20(a) and 20(b) are a top plan view and a front view of the flash tube of FIG. 19.
Figure 20B:
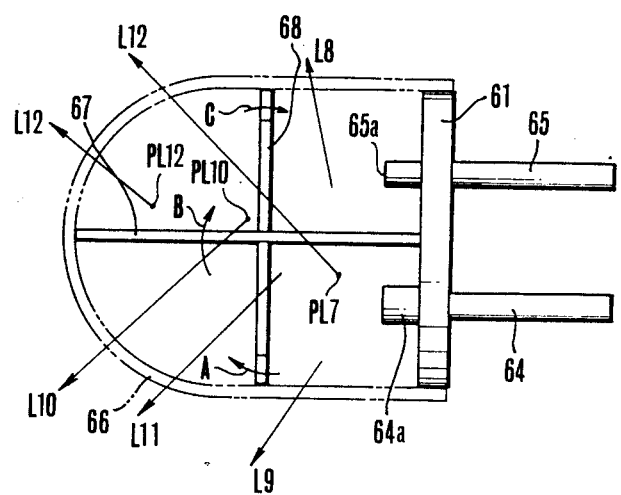

FIG. 19 shows in an oblique view a miniature lamp type flash tube embodying this invention. FIGS. 20(a) and 20(b) show the same embodiment in a top plan view and a front view respectively. Referring to these drawings, a circular bottom plate 61 is made of, for example, a light-transmissive, insulating fine-ceramic or glass material. The bottom plate 61 is encompassed with a glass tube 66 which has its fore end formed into a spherical shape as indicated by a two-dot chain line.

Shield plates 67 and 68 are made of a light-transmissive, insulating fine-ceramic or glass material. The shield plate 68 is in a partly cutaway circular shape and is disposed at a given distance away from the bottom plate 61 in parallel to the latter. Meanwhile, the other shield plate 67 is disposed perpendicular to the middle part of the bottom plate 61. The shield plates 67 and 68 are thus combined to divide the inside of the glass tube 66 into four chambers. Cathode and anode electrodes 64 and 65 pierce through the bottom plate 61. The cathode electrode 64 has its sintered electrode part 64a disposed within the glass tube 66. The anode electrode 65 has an end part 65a protruding from the bottom plate 61.

A transparent conductive coat mainly comprising tin oxide is applied to the outer circumferential surface of the glass tube 66 and is arranged to serve as a trigger electrode. A rare gas such as xenon is sealed in the glass tube 66. When a high voltage is applied to the flash tube between the cathode and anode electrodes 64 and 65 with a trigger voltage applied to the trigger electrode at the same time, electrons are discharged via a route indicated by arrows A, B and C in the drawing. Then, arc discharge takes place to effect flashing.

Figure 21:
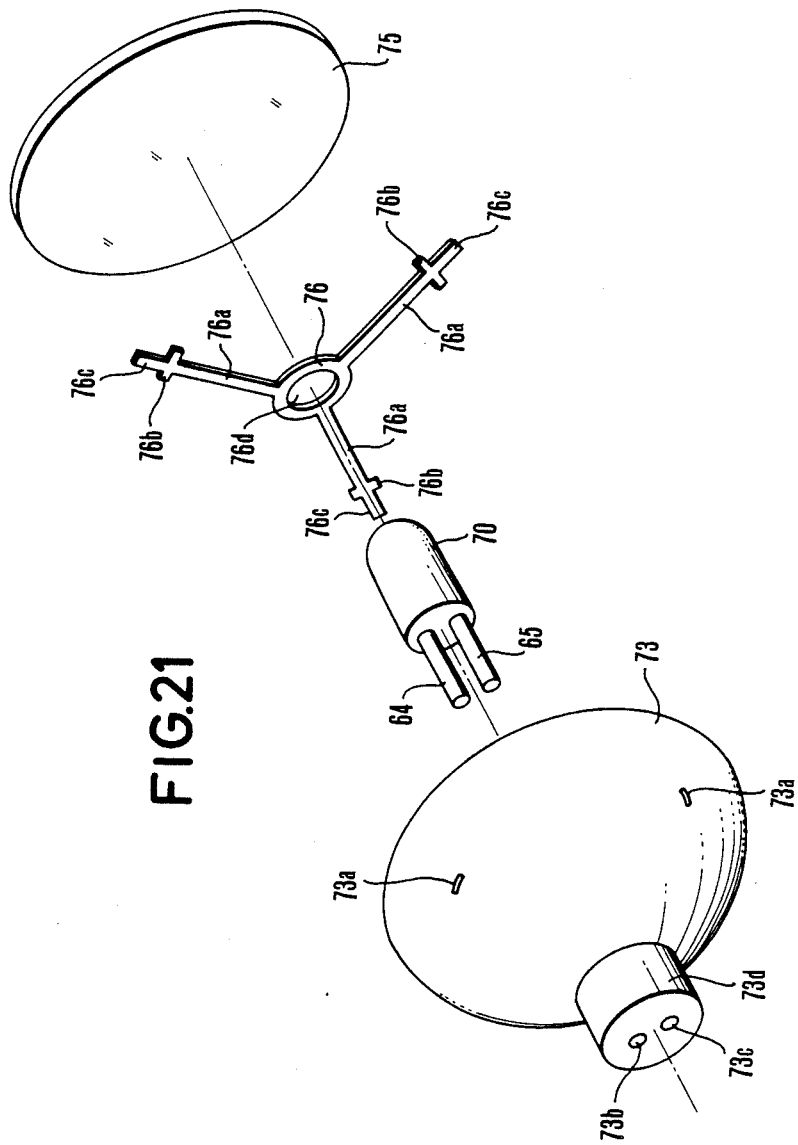
FIG. 21 is an exploded view showing an electronic flash unit to which the flash tube of FIG. 1 is applied.
Figure 22:
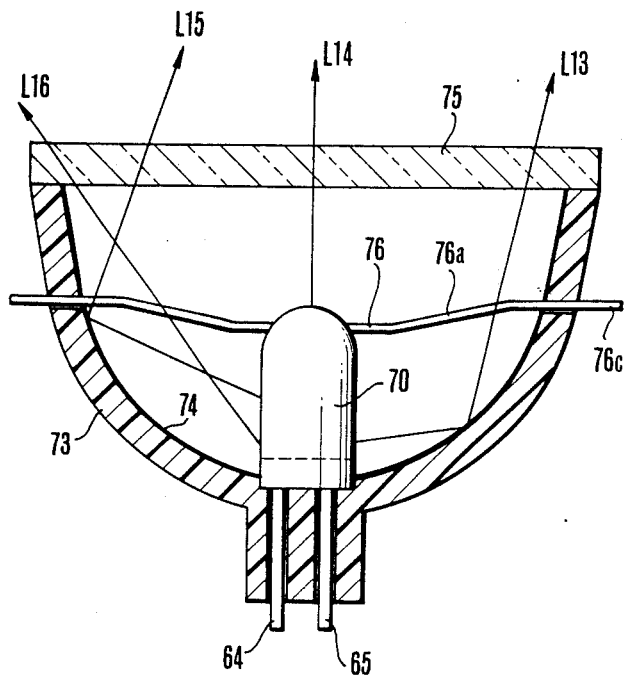
FIG. 22 is a sectional view showing the electronic flash unit of FIG. 21 as in an assembled state.

FIG. 21 is an exploded view showing an arrangement made according to this invention for mounting a reflector on the miniature type flash tube shown in FIGS. 19 and 20. FIG. 22 shows in a sectional view the same reflector as in a state of having been mounted on the flash tube. Referring to FIGS. 21 and 22, a reference numeral 70 denotes the miniature type flash tube of FIG. 19. The flash tube 70 is provided with the cathode and anode electrodes 64 and 65. A numeral 73 denotes the reflector which is made of a synthetic resin material and has aluminum coat 74 applied to the inner surface thereof by vacuum evaporation. A protector 75 is disposed in front of the reflector. A trigger leaf spring 76 has three legs 76a. A positioning protrudent part 76b is formed at the fore end of each of the legs 76a. When the fore ends 76c of the legs 76a are inserted into three holes 73a provided in the reflector 73, the extent of insertion is limited by the protrudent parts 76b.

The middle part of the trigger leaf spring 76 is in a ring shape 76d which is arranged to have the spherical fore end part of the flash tube 70 fitted therein. The inner diameter of the ring 76d is somewhat smaller than the diameter of the flash tube 70. The transparent conductive coat which serves as a trigger electrode is applied at least to the outer surface of the spherical fore end part of the flash tube 70. The trigger electrode is therefore brought into contact with the trigger leaf spring 76. With the embodiment arranged in this manner, when a lead wire which is not shown but extends from a known flash trigger circuit comes into contact with the fore end part of the trigger leaf spring 76, the flash tube 70 can be triggered. A cylindrical part 73d is disposed below the reflector 73. The part 73d is provided with holes 73b and 73c which are arranged to have the cathode and anode electrodes 64 and 65 inserted therein respectively. These holes 73b and 73c serve to define the positions of the flash tube and the reflector 73 relative to each other. The fore end position of the flash tube 70 is defined by the above stated trigger leaf spring 76. The flash tube 70 is thus prevented from being moved by vibrations.

With a flash unit assembled into a state as shown in FIG. 22, arc discharge takes place between the cathode and anode electrodes 64 and 65 when a trigger pulse signal is applied from a trigger circuit to the flash tube 70 in the manner as mentioned in the foregoing. Then, rays of flash light L1 to L16 illuminate an object such as a person or persons via routes as shown in FIGS. 19, 20 and 22. For example, the light generated at a point PL7 illuminates the object after passing through two shield plates 67 and 68. The light generated at a point PL10 passes through the shield plate 67 before illuminating the object. The light generated at a point PL12 passes through the glass tube 66 before illuminating the object.

Figure 23:
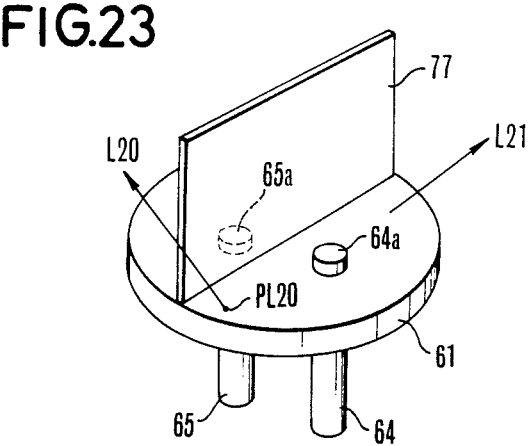
FIG. 23 is an oblique view showing the essential parts of a flash tube included in a further embodiment of this invention.
Figure 24:
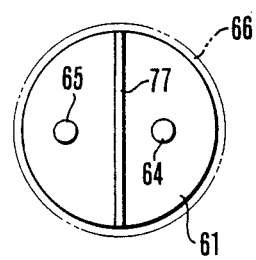
FIG. 24 is a top plan view of the flash tube of FIG. 23.
Figure 25:
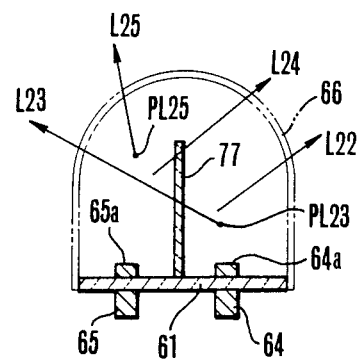
FIG. 25 is a sectional view showing the flash tube of FIG. 25.

FIGS. 23, 24 and 25 show a flash tube arranged as another embodiment of this invention. FIG. 23 shows the essential parts of it in an oblique view. FIG. 24 shows it in a top plan view. FIG. 25 shows it in a sectional view. This embodiment differs from the preceding example of embodiment of FIGS. 19 to 22 in that a shield plate 77 is formed with a single plate made of a light transmissive, insulating fine-ceramic or glass material. With the exception of this point, the rest of this embodiment is arranged in the same manner as the preceding example shown in FIGS. 19 to 22. The members performing the same functions as those of the preceding example of FIGS. 19 to 22 are indicated by the same reference numerals and their details are omitted from the following description. Referring to FIGS. 23, 24 and 25, when a trigger pulse signal is applied from a trigger circuit to a trigger electrode, arc discharge takes place between main electrodes 64 and 65. Then, the light generated, for example, at a point PL20 passes through the shield plate 77 to illuminate an object to be illuminated (not shown). The light generated at a point PL 23 passes through the shield plate 77 and a glass tube 66 to illuminate the object. Further, the light generated at a point PL25 illuminates the object after passing through the glass tube 66.

In the cases of the embodiments shown in FIGS. 19 to 25, the arc-length of the miniature lamp type flash tube is lengthened by partitioning the inside of the flash tube between the main electrodes with the shield plate. The shield plate is arranged to be light transmissive as well as insulating. The shield plate thus allows the light to pass through it to prevent the shadowing effect of the shield plate on the illumination light, so that the light distribution characteristic of the flash unit can be improved. This enhances the rate of utilization of light generated by the flash tube. Therefore, a greater quantity of light is obtainable than the conventional flash unit from a voltage applied to the flash tube.

Further, in the embodiment described, a trigger electrode terminal is formed by a leaf spring. The leaf spring not only contacts the transparent conductive coat applied to the outer surface of the spherical fore end part but also serves to constantly urge and push the flash tube against the reflector. The flash tube thus can be stably carried by the reflector by virtue of the leaf spring which serves as a simple, reliable trigger electrode.

While the embodiment described has the whole surface of the shield plate arranged to be light transmissive, the above stated problem is of course soluble by arranging only a portion of the shield plate to be light transmissive instead of the whole surface thereof.

In the case of FIG. 19, the shield plates 67 and 68 are preferably molded in one body, because: If they are discretely formed and assembled, the cost of the flash tube would increase due to poor workability.

Figure 26:
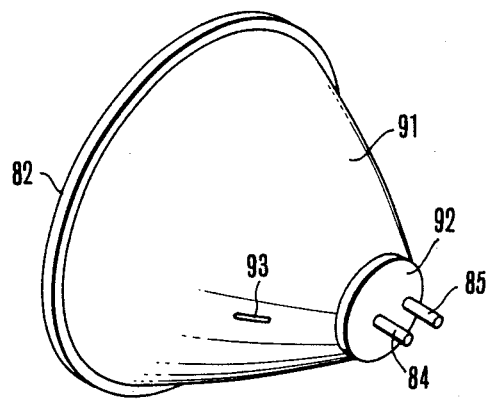
FIG. 26 is an oblique view showing the miniature lamp type flash tube mounting arrangement of an electronic flash unit as a further embodiment of this invention.
Figure 28:
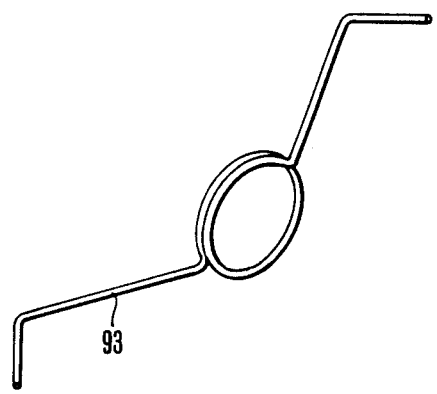
FIG. 28 is an oblique view showing a trigger line which is made of a resilient wire material and is shown also in FIG. 27.
Figure 27:
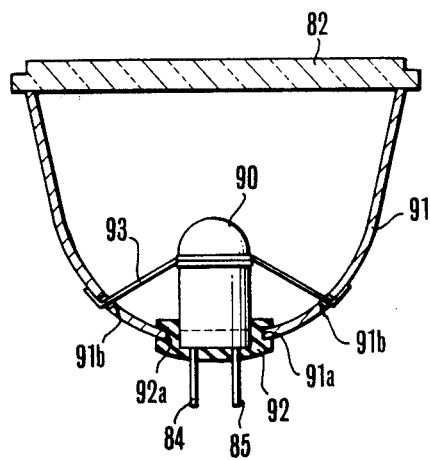
FIG. 27 is a longitudinal sectional view taken in the middle part of FIG. 26.
Figure 29:
FIG. 29 is an oblique view showing the shape of a rubber bush shown in FIG. 27.

FIG. 26 shows in an oblique view a mount arrangement for mounting on a reflector the miniature lamp type flash tube of each of the embodiments described in the foregoing. FIG. 27 is a longitudinal sectional view taken along the middle part of the device shown in FIG. 26. Referring to FIGS. 26 and 27, a miniature lamp type flash tube 90 is arranged in a manner similar to one of the flash tubes of preceding embodiment examples. The flash tube 90 is provided with cathode and anode electrodes 84 and 85. A reflector 91 has a circular opening. A protector 82 is disposed in front of the reflector 91. The protector 82 is secured to the reflector 91 by means of a member which is not shown. A rubber bush 92 is made of silicon rubber or the like. Referring to FIG. 29, the rubber bush 92 is provided with a recessed groove 92a which is formed round the outer circumference of the bush 92 and is fitted into a mount hole 91a formed in the middle part of the reflector 91. The flash tube 90 is inserted in the rubber bush 92 and is carried by the elastic force of the latter. A transparent, conductive coat mainly comprising tin oxide is applied to the outer circumferential glass surface of the flash tube 90. A trigger line 93 is wound round the outer glass surface of the flash tube 90. The trigger line 93 is made of a resilient line material and is in a coiled torsion spring like shape being wound 1½ turns round the flash tube 90. The trigger line 93 is fitted on the outer circumferential surface of the flash tube 90 with its inside diameter temporarily enlarged. Therefore, the flash tube 90 is tightly embraced by the resilience of the trigger line 93. The two ends of the trigger line 93 is bent into an L shape. The two ends of the trigger line 93 is inserted into holes 91b provided in the side wall of the reflector 91 with the bent L shaped end parts serving to prevent the line 93 from pulling out of the holes 91b. With the trigger line 93 thus arranged in the shape of a coiled torsion spring, it urges the flash tube 90 downward in an assembled state as shown in FIG. 27. By virtue of this urging force, the flash tube 90 is stably carried by the reflector 91. Further, the electrode terminals of the flash tube 90 pierce through the rubber bush. These electrodes are reliably insulated from each other. Since the flash tube 90 is inserted into a recessed groove formed along the inner circumference of the rubber bush 92, the flash tube 90 is stably carried also by the resilience of the rubber bush 92. Further, since the outer recessed groove 92a of the rubber bush 92 is fitted into the mount hole 91a of the reflector 91, the flash tube 90 precisely mounted on the reflector with ease.

In the embodiment described above, the rubber bush is provided with a peripheral groove which fittingly engages the mount hole of the reflector in mounting the miniature type flash tube on the reflector; with holes which allows the electrode terminals of the flash tube to pierce through the bush; and also with an inner circumferential groove which allows the flash tube to be inserted into the bush. This rubber bush arrangement not only permits accurate, reliable and easy mounting of the flash tube on the reflector but also ensures adequate electrical insulation.

Figure 30:
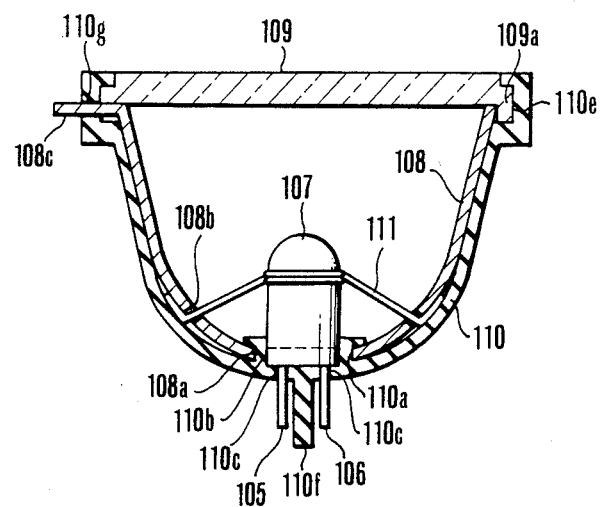
FIG. 30 is a sectional view showing the miniature lamp type flash tube mounting arrangement of an electronic flash unit arranged as a further embodiment of this invention.
Figure 31:
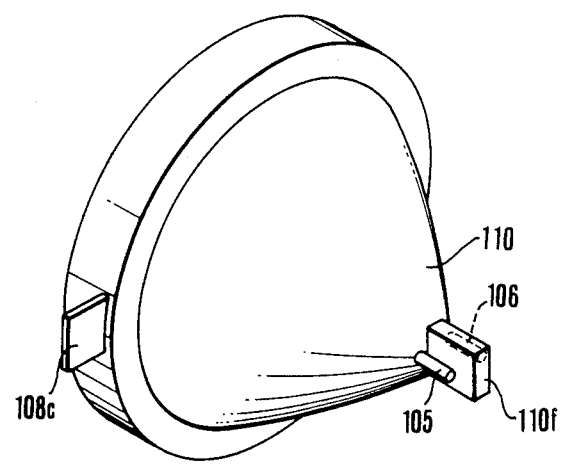
FIG. 31 is an oblique view of the same device.
Figures 32, 33, 34:
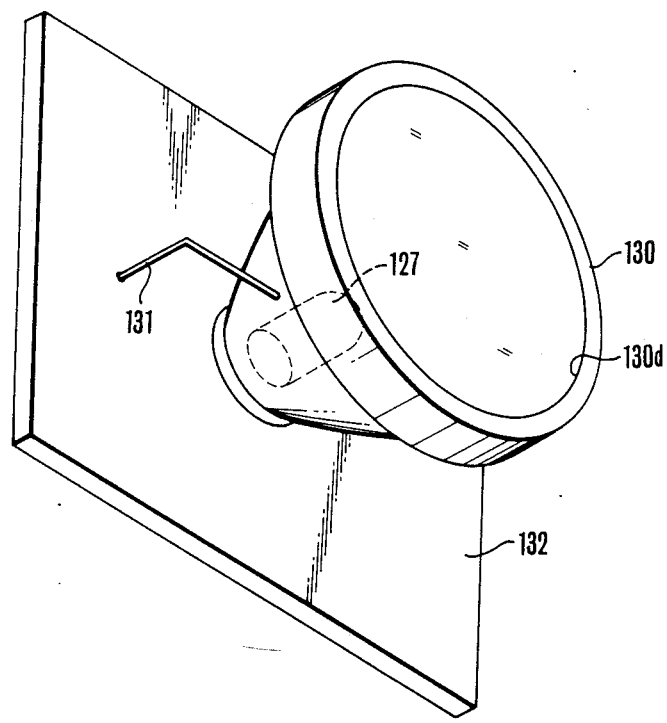
FIG. 32 is an oblique view of a trigger line shown in FIG. 30.
FIG. 33 is a longitudinal sectional view showing the miniature lamp type flash tube mounting device of another embodiment of this invention.
FIG. 34 is an oblique view showing in outline the same device. FIG.

FIG. 30 is a longitudinal sectional view showing another mount arrangement for mounting on a reflector the miniature lamp type flash tube which is arranged in the same manner as in any of the embodiments described in the foregoing. FIG. 31 is an oblique view showing the same mount arrangement as viewed from behind the reflector. Referring to FIGS. 30 and 31, the reflector 108 is made of a metal material such as aluminum and circularly opens. A protector 109 which has a Fresnel lens part (not shown) is disposed in front of the reflector 108 and is secured to the latter by means of a rubber cover 110, which will be described later. The reflector 108 is provided with a mount hole 108a which is formed in the rear middle part of the reflector 108 and is arranged to allow the flash tube 107 inserted therein. The reflector 108 is provided further with holes 108b for allowing two ends of a trigger line 111 to pierce through them and a protrudent part 108c which is arranged to serve as a trigger terminal and protrudes outward from a peripheral part of the open end of the reflector 108. A transparent conductive coat mainly comprising tin oxide is applied in the same manner as mentioned in the foregoing to the outer circumferential surface of a glass tube which forms a part of the flash tube 107. The above stated trigger line 111 is wound round the outer surface of the glass tube. The trigger line 111 is made of a resilient material and is wound round at least one and a half turns into the shape of a coiled torsion spring, as shown in FIG. 32. The inside diameter of the coiled part of the trigger line 111 is temporarily enlarged in fitting it onto the outside of the glass tube. Therefore, the trigger line 111 and the flash tube 107 are in one unified body by virtue of the resilience of the former. Two ends of the trigger line 111 are bent approximately into an L shape after they pierce through holes 108b provided in the side wall of the reflector 108. The bent ends thus prevent the trigger line from pulling out of these holes. With the trigger line 111 thus arranged in the coiled-torsion-spring like shape, it exerts a downward pulling force on the flash tube 107 under a condition as shown in FIG. 30. This enables the reflector 8 to stably hold the flash tube 7 in a set position.

The rubber cover 110 which is made of a silicon rubber material or the like is arranged to cover the whole outer surface of the reflector 108 and thus to prevent the external wall surface of the reflector 108 from being exposed to the outside. The rubber cover 110 thus serves as an electrical insulation for things located outside. The rubber cover 110 is provided with a slot 110a which is arranged to have the mount hole part 108a of the reflector 108 fitted therein; a groove 110b which is formed along the inner circumferential side of the slot 110a; and two holes 110c which are arranged to allow the cathode and anode electrode terminals 105 and 106 of the flash tube 107 to pierce therethrough. The flash tube 107 is fitted into the groove 110b via these holes 110c. The tube 107 is thus stably carried by the resilience of the rubber cover 110. The rubber cover is further provided with a C shaped fitting part 110e, which is arranged to have a flange part 109a of the above stated protector 109 fitted therein. The protector 109 is thus brought into tight contact with the reflector 108 by virtue of the resilience of the rubber.

The rubber cover 110 has an outward protruding part 110f located in between the holes 110c through which the electrode terminals 105 and 106 of the flash tube 107 pierce; and another hole 110g arranged in a position to allow the above stated protruding part 108c which serves as the trigger terminal to pierce the rubber cover 110. The above stated arrangement of the rubber cover 110 eliminates the hazard of having the two electrode terminals brought into contact by a soldering lump or the like that might result from soldering work in connecting lead wires to the electrode terminals 105 and 106. It also precludes the possibility of having the electrode terminals warped into contact by some external force exerted when the flash unit is set in place within the camera after the lead wire is soldered.

In the case of this embodiment, the rubber cover 110 which is made of an insulating elastic material such as silicon rubber is utilized in mounting the miniature lamp type flash tube 107 on the reflector 108. The arrangement of the embodiment not only facilitates the mounting work and enhances the mounting precision but also ensures adequate insulation and protection of the outer surface of the reflector with a reduced number of parts required for the mounting work. It is a further advantage of the embodiment that the outward protruding part 110f disposed in between the holes 110c provided for allowing the electrode terminals 105 and 106 to pierce therethrough as mentioned above effectively prevents short-circuiting between these electrode terminals.

Figure 35:
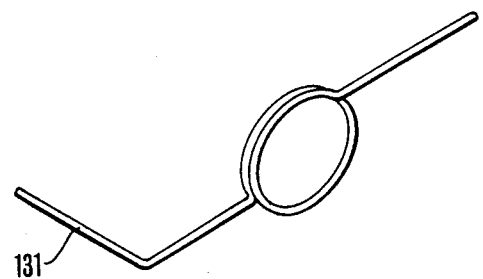

FIG. 33 shows, in a longitudinal central sectional view, an arrangement made according to this invention to mount on a reflector any of the miniature lamp type flash tubes described in the foregoing as various embodiments of this invention. FIG. 34 is an oblique view showing it in outline. The reflector 128 which is made of a metal such as aluminum opens in a circular shape. A protector 129 which has a Fresnel lens part (not shown) is secured to the front of the reflector 128 by means of a rubber cover 130 (the details of the cover will be described later with reference to FIG. 36). The reflector 128 has a mount hole 128a in the rear middle part (on the lower side as viewed in FIG. 33). The flash tube 127 is inserted in the mount hole 128a. The reflector 128 is provided further with holes 128b for inserting two ends of a trigger line 131 therein. A transparent conductive coat which mainly comprises tin oxide is applied to the outer circumferential surface of a glass tube which is a part of the flash tube 127. The trigger line 131 is wound round the outer circumference of the glass tube. Referring to FIG. 35, the trigger line 131 is made of a resilient material and is in the shape of a coiled torsion spring wound round one and a half turns. The trigger line 131 is fitted on the outer circumferential surface of the glass tube with the inside diameter of the coiled shape temporarily enlarged. The trigger line 131 is thus in one unified body with the flash tube 127. One end of the trigger line 131 is bent into an L shape as shown in the drawings. The bent end of the trigger line 131 is soldered via a hole part 132a to the reverse side of a printed circuit board 132 which includes a trigger circuit therein.

Figure 36:
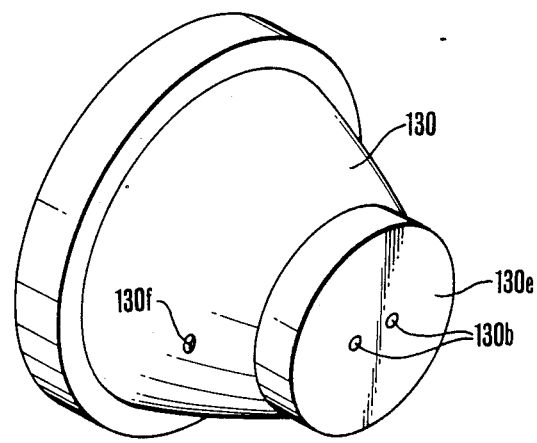
FIG. 36 is is an oblique view showing a rubber cover shown in FIG. 33.

FIG. 36 shows the above stated rubber cover 130 in an oblique view. The rubber cover 130 which is made of a silicon rubber or the like is in a shape covering the whole outer wall surface of the reflector 128 to prevent the latter from being exposed to the outside. The rubber cover 130 is thus arranged to electrically insulate the reflector 128 from the outside. The rubber cover 130 is provided with a groove 130a in which the mount hole part 128a of the reflector 128 is to be fitted; a recessed groove 130b which is formed along the inner circumference of the groove 130a; and holes 130c in which the cathode and anode electrode terminals 125 and 126 are inserted. The flash tube 127 is fitted into the recessed groove 130b via the hole part 132b of the above stated printed circuit board 132 and is kept in place by the resilient force of the rubber cover 130. The rubber cover 130 is further provided with a fitting part 130d which is formed along the opening edge of the rubber cover 130 in a C-like sectional shape. The flange part 129a of the protector 129 is fitted into this fitting part 130d to be thus brought into tight contact with the reflector 128 by virtue of the resilience of the rubber.

The rubber cover 130 is provided also with a protrudent part 130e which is formed in the bottom part of the rubber cover 130; and the hole parts 130f through which the trigger line 131 pierces. The protrudent part 130e has a flat face which is arranged to be directly in contact with the above stated printed circuit board 132 in an assembled state as shown in FIG. 33. Therefore, under the assembled condition, the rubber cover 130 which carried the flash tube 127 and the reflector 128 is stably mounted on the printed circuit board 132.

Figure 37:
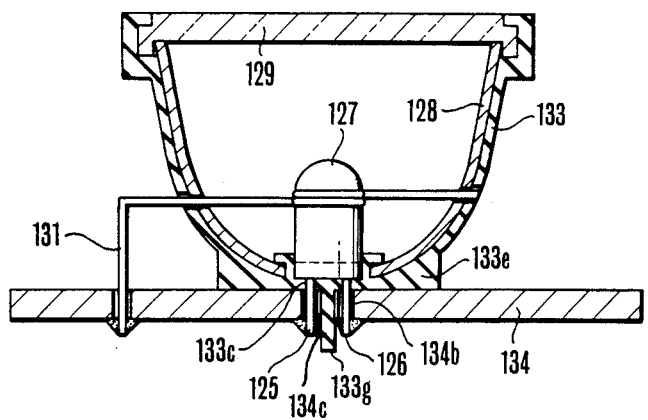
FIG. 37 is a longitudinal sectional view showing a miniature lamp type flash tube mounting arrangement arranged as a further embodiment of this invention.
Figure 38:
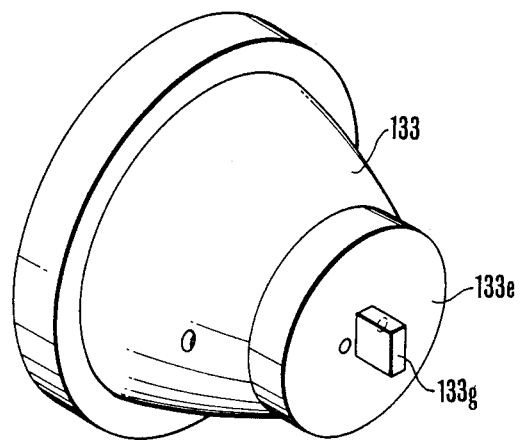
FIG. 38 is an oblique view of a rubber cover shown in FIG. 37.

FIGS. 37 and 38 show by way of example a modification of of the embodiment shown in FIG. 33. FIG. 37 is a sectional view taken longitudinally across the above stated modification. FIG. 38 shows the rubber cover in an oblique view. This embodiment differs from the preceding embodiment shown in FIG. 33 in the following points: In this case, a projection 133g is formed to protrude between hole parts 133c which are provided in the flat face part of the protrudent part 133e of the rubber cover 133 and are arranged to permit the electrode terminals 125 and 126 of the flash tube 127 to pierce therethrough; and a hole part 134c is provided in the printed circuit board 134 to permit the projection 133g to pierce therethrough. This shape of the rubber cover 133 effectively eliminates the hazard of shortcircuit that might take place when the two electrode terminals accidentally come into contact with each other due to soldering lumps resulting from soldering work performed in connecting lead wires to these electrode terminals 125 and 126.

In the case of the embodiments shown in FIGS. 33 to 38, the miniature lamp type flash tube 127 is mounted on the reflector 128 with the rubber cover 130 (or 133) utilized for insulating the electrodes of the flash tube 127 from each other and also for carrying the flash tube 127. Further, the bottom part of the rubber cover 130 or 133 is formed in a flat face for having the reflector 128 stably carried on the printed circuit board 134. The arrangement of the rubber cover not only facilitates mounting work but also enhances the reliability of the embodiment.

Figure 40:
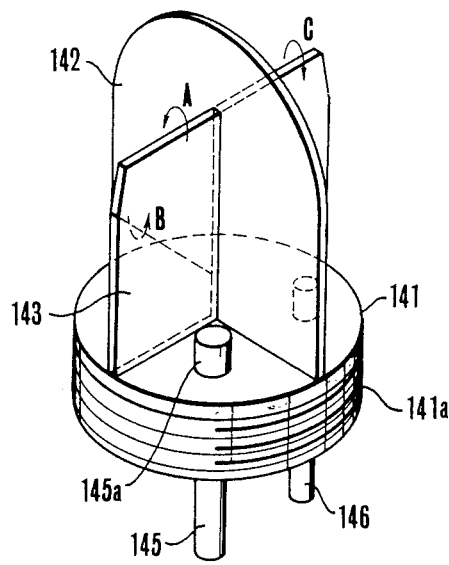
FIG. 40 is an oblique view of a flash tube to be employed in the embodiment shown in FIG. 39.
Figure 41A:
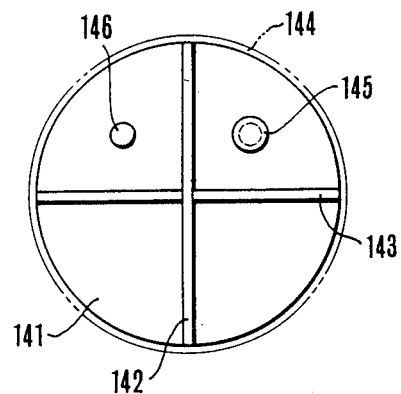
FIGS. 41(a) and 41(b) are a top plan view and a front view showing the same flash tube.
Figure 41B:
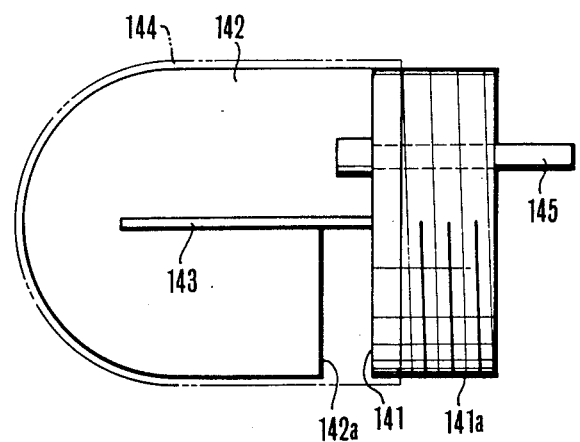

Another embodiment of this invention is arranged as follows: FIGS. 40, 41(a) and 41(b) show a miniature lamp type flash tube employed in the embodiment. A bottom plate is made of a ceramic or glass material and is formed in a cylindrical shape. A male screw (or external thread) part 141a is formed on the circumferential side of the bottom plate 141. First and second shield plates 142 and 143 are intercrossed and disposed perpendicular to the bottom plate 141. The inside of a glass tube which will be described later is divided into four chambers by the shield plates 142 and 143. The fore end of the first shield plate 142 is formed in an arcuate shape along the inside wall surface of the glass tube. The second shield plate 143 is formed to be shorter in the longitudinal direction than the length of the first shield plate 142. A cutout part 142a is provided in a suitable part of the first shield plate 142 on the side of the bottom plate 141. As a result, the first shield plate 142 is attached to the bottom plate 141 along about one half of one side thereof. The glass tube 144 is arranged to cover one end part of the the bottom plate 141 and the external edges of the shield plates 142 and 143. The fore end part of the glass tube 144 is in a semi-spherical shape. The cathode and anode electrode terminals 145 and 146 of the flash tube are arranged to pierce through the bottom plate 141. The cathode electrode terminal 145 has its sintered electrode 145a disposed within the glass tube. The inside of the glass tube 144 is filled with a rare gas such as xenon. When a high voltage is applied between the two electrode terminals 145 and 146, discharged electrons move in the directions and in the order of arrows A, B and C as shown in FIG. 40 and arc discharge takes place. A transparent conductive coat mainly comprising, for example, tin oxide is applied to the outer circumferential surface of the glass tube 144 and a part of the male screw part 141a of the bottom plate 141 on the side of the glass tube 144. The transparent conductive coat is arranged to serve as a trigger electrode.

With the inside of the glass tube 144 thus divided into smaller parts by the shield plates 142 and 143, the same arc length is obtained between the two electrode terminals 145 and 146 as the conventional straight tube type flash tube, so that the flashing efficiency of the embodiment is about the same as the conventional flash tube. The flash tube arrangement of this embodiment is applicable also to other embodiments.

Figure 39:
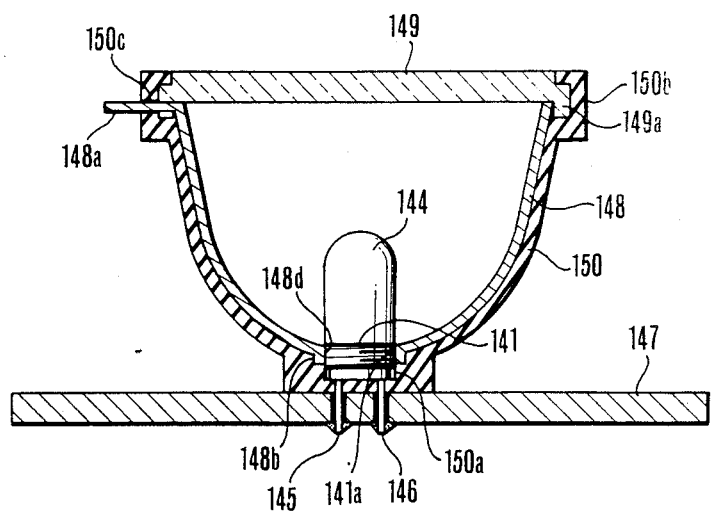
FIG. 39 is a longitudinal section of a further embodiment of this invention as in a state of having a reflector mounted on a flash tube, the sectional view being taken along a line D-D shown in FIG. 42.
Figure 42:
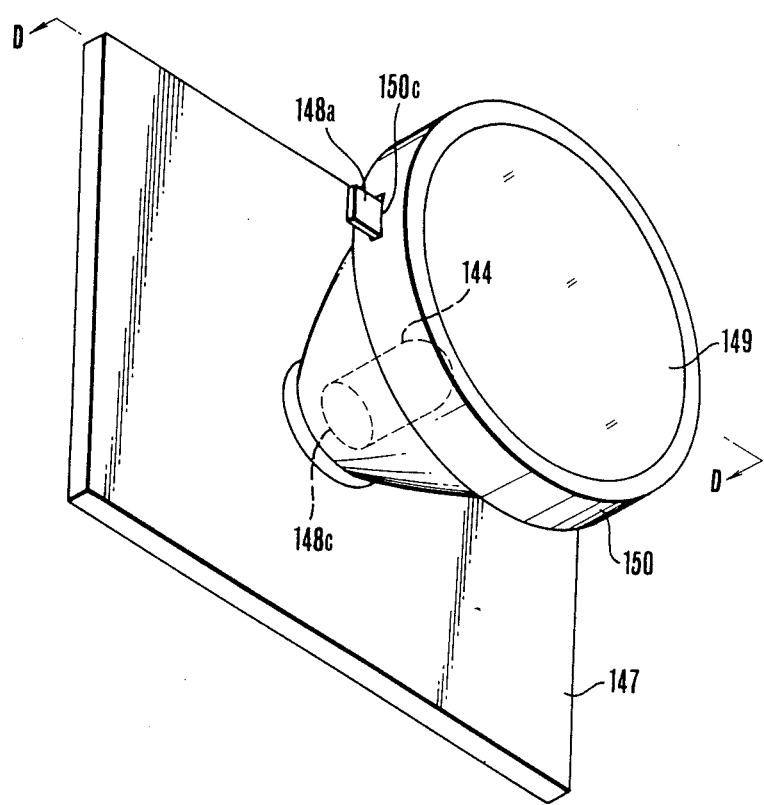
FIG. 42 is an oblique view showing the same embodiment as in a state of having the flash tube mounted on a reflector.

The miniature lamp type flash tube is mounted in a manner as shown in FIGS. 39 and 42. In these drawings, the same components as those shown in FIG. 41 are indicated by the same reference numerals and the details of them are omitted from the following description. The cathode and anode electrode terminals 145 and 146 pierce through a printed circuit board 147 and is soldered to the reverse side of the printed circuit board 147. A reflector 148 which is made of a metal material such as aluminum is formed to open in a circular shape. A protector 149 is arranged to cover the whole opening area of the reflector 148. A trigger terminal 148a is provided in one body with the reflector 148 and is arranged to extend outward from the open circumferential end of the reflector 148 approximately perpendicular to the optical axis of the protector 149. The rear middle part (lower side as viewed on FIG. 39) of the reflector 148 is thick and arranged to protrude downward to form a protrudent part 148b. The protrudent part 148b is provided with a mount hole 148c. A female screw (or internal thread) part 148d is formed along the inner circumference of the mount hole 148c and is arranged to engage the above stated male screw part 141a. In an assembled state as shown in FIG. 39, the transparent conductive coat is in a conductive relation to the reflector 148.

A cover 150 is made of an insulating elastic material such as silicon rubber or the like. The cover 150 is provided with a spot facing hole 150a which is formed in the middle part of the cover 150. The end of the bottom plate 141 on the electrode side thereof is carried by the hole 150a. The above stated two electrode terminals 145 and 146 pierce through the cover 150 at the lower part of the hole 150a. A retaining part 150b which is of a C-like sectional shape is formed in one body with the cover 150 along the opening edge of the cover. The retaining part 150b is provided with a hole 150c which is arranged to allow the above stated trigger terminal 148a to be inserted therein. The protector 149 is provided with a flange part 149a which is formed in one unified body with and along the periphery of the protector 149 and extends downward. The flange part 149a engages the above stated retaining part 150b in such a manner that the cover 150 urges the protector 149 to move downward as viewed on FIG. 39 and pushes the latter against the opening end part of the reflector 148. The flash tube of the embodiment which is arranged as described above is assembled in the following manner:

The flash tube is first inserted into the mount hole 148c of the reflector 148 to make them into one body. In this instance, the bottom plate 141 of the flash tube is inserted from the upper side (as viewed on FIG. 39) and the flash tube is turned round in the direction of screwing it in. This causes the male screw part 141a of the bottom part 141 to engage the female thread part 148d of the reflector 148 to bring the flash tube and the reflector into a unified state. Then, with the protector 149 disposed in front of the reflector 148, the cover 150 is mounted on the reflector 148. The flange part 149a of the protector 149 and the lower end part of the bottom plate 141 are then respectively carried by the retaining part 150b and the spot facing hole 150a of the cover 150 in a tight state without any play. In the last place, the cathode and anode electrode terminals 145 and 146 of the flash tube are pushed to pierce through the holes provided in the printed circuit board 147 and is soldered to the reverse side of the printed circuit board 147.

The embodiment described above enables the miniature lamp type flash tube to be accurately positioned and mounted on the reflector without difficulty and gives a desired light distributing characteristic. Further, the arrangement to simply screw the flash tube into the reflector in unifying them into one body greatly facilitates the assembly work on the flash unit. Further, since it is not necessary to form the trigger electrode terminal of the flash tube by using a discrete member, a mounting arrangement which eliminates the possibility of hindrance to the illuminating light is obtainable at a low cost.

Figure 43:
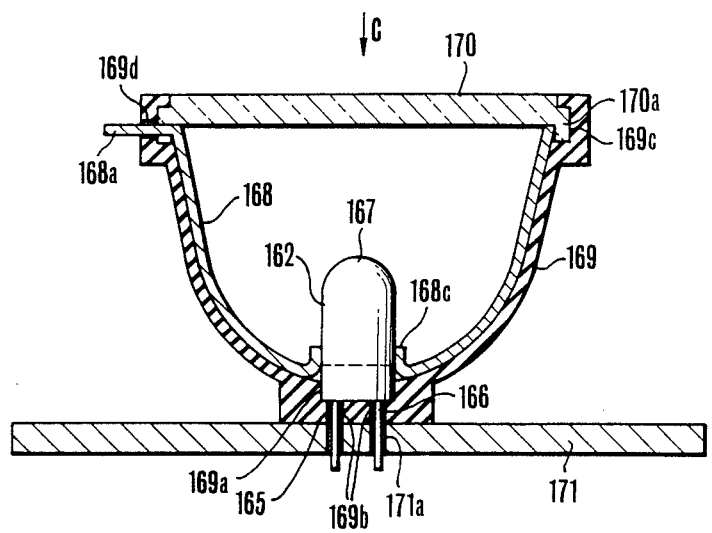
FIG. 43 is a longitudinal section showing a miniature lamp type flash tube mounting arrangement arranged as a further embodiment of this invention.
Figure 44:
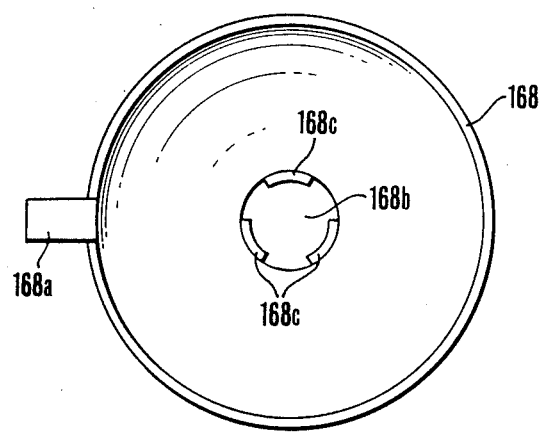
FIG. 44 is a plan view of reflector shown in FIG. 43.
Figure 45:
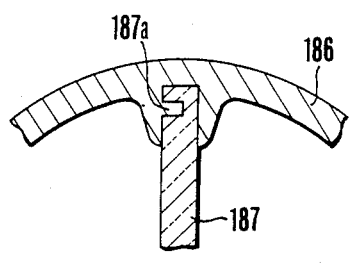
FIGS. 45 to 48 show the glass tube and the shield plate of a flash tube of a further embodiment as in a state of being welded.
Figure 47:
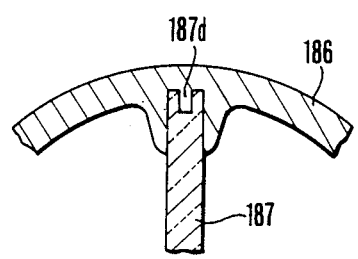
Figure 46:
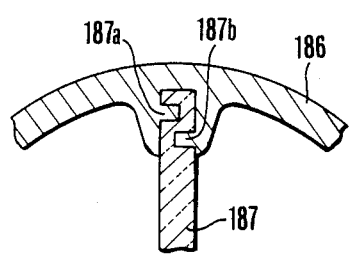
Figure 48:
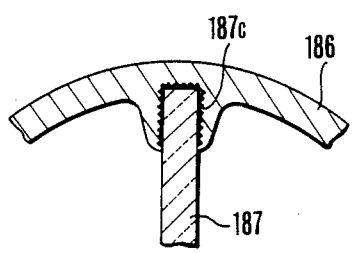

FIG. 43 shows another example of invented arrangement for mounting any of the miniature lamp type flash tubes of the embodiments described in the foregoing on a reflector. FIG. 44 is a plan view, taken from above, of the reflector shown in FIG. 43. Referring to FIGS. 43 and 44, the reflector 168 is made of a conductive metal material such as aluminum or the like and is formed into a circular opening shape. An outward protruding part 168a extends from a part of the opening edge of the reflector 168 and is arranged to serve as a trigger terminal. The trigger terminal 168a is connected to a lead wire leading to a known trigger circuit. In the rear middle part (lower side as viewed on FIG. 43) of the reflector 168 is formed a mount hole 168b which permits a flash tube 167 to be mounted on the reflector. A flange part 168c which rises in the optical axis direction is formed round the mount hole 168b in one body with the reflector 168. In the case of this embodiment, the flange part 168c is divided into three parts spaced at given equal distances in such a way as to give a certain degree of resilience. In a completely mounted state as shown in FIG. 43, the flange part 168c is in contact with the above stated transparent conductive coat for electrical connection.

A rubber cover 169 which is made of a silicon rubber or the like is formed into a shape covering the whole outer surface of the reflector 168. A recess 169a is arranged in the rear middle part (or lower part as viewed on FIG. 43) of the rubber cover 169 to have the above stated flash tube 167 fitted therein. Holes 169b are provided in the bottom of the recess 169a for allowing the electrode terminals 165 and 166 of the flash tube 167 to pierce therethrough. A retaining part 169c which is in an approximately C sectional shape is formed in one body with the rubber cover 169 along the opening edge part of the rubber cover. A hole 169d is provided in the retaining part 169c for allowing the above stated protrudent part 168a which serves as the trigger terminal to pierce therethrough. A protector 170 having a Fresnel lens part (not shown) is provided with a flange part 170a which extends downward as viewed on FIG. 43 from the periphery of the protector 170. The flange part 170a engages the above stated retaining part 169c of the rubber cover 169. The protector 170 is thus urged downward by the resilience of the retaining part of the rubber cover 170 as viewed on FIG. 43 and is kept in tight contact with the opening edge of the reflector 168. A printed circuit board 171 is provided with holes 171a which is arranged to have the electrode terminals 165 and 166 to be soldered to the reverse side of the printed circuit board 171 by piercing these holes.

The flash tube 167 is mounted on the reflector 168 in the following manner: The flash tube 167 is first inserted into the mount hole 168b of the reflector 168 for unifying them into one body. In this instance, The glass tube 162 of the flash tube 167 can be readily inserted into the reflector 168 from below (see FIG. 43) as the upper end of the glass tube 162 and the lower end of the flange part 168c of the reflector 168 are both arcuately formed. Next, the rubber cover 169 is mounted on the reflector 168 with the protector 170 set in front of the reflector 168. Under the condition thus obtained, the flange part 170a of the protector 170 and the electrode terminals 165 and 166 of the flash tube 167 are tightly carried by virtue of the retaining part 169c, the recess 169a and the holes 169b of the rubber cover 169. In the last place, the electrode terminals 165 and 166 of the flash tube 167 are allowed to pierce through the holes 171a of the printed circuit board 171 and are soldered to the reverse side of the printed circuit board 171.

In using the flash unit having the miniature lamp type flash tube 167 of the kind described in the foregoing, a voltage is accumulated at a main capacitor by means of a known power supply circuit. Then, in synchronism with the shutter of a camera, a high ringing voltage is applied via the protrudent part 168a and the flange part 168c of the reflector 168 to the trigger electrode which is the transparent conductive coat applied to the glass tube 162. In response to this, arc discharge takes place between the cathode and anode electrodes 165 and 166 to give a flash light required for photographing illumination. In the embodiment of this invention, the flange part 168c which has some inward resilience is formed in one body with the reflector 168 for the purpose of mounting the miniature lamp type flash tube 167 on the reflector 168. Therefore, the flash tube 167 can be accurately positioned without any rattling and play and also can be mounted on the reflector 168 with ease, so that a desired light distributing characteristic can be obtained. Further, the reflector 168 is utilized as a part of the trigger electrode terminal thus obviating the necessity of discretely arranging a trigger electrode terminal for the flash tube 167. This mounting arrangement is obtainable at a low cost without hindering the illuminating light. Further, the external surface of the reflector 168 which is utilized as a part of the trigger electrode terminal is covered with the rubber cover 169. The rubber cover 169 effectively prevents any electrical contact with the outside, or shortcircuit, and also serves to protect the reflector 168.

In this specific embodiment, the flange part 168c of the reflector 168 is divided into three parts which are spaced at predetermined distances for the purpose of carrying the flash tube 167. However, this arrangement may be changed to have the flange part formed in a continuous ring shape. The reflector 168 is made of a conductive material. However, the reflector may be made of a synthetic resin material with aluminum coating applied to the surface thereof by vacuum evaporation. In that event, the reflector which is made of the synthetic resin material insulates the unit from the outside by itself.

FIGS. 45 to 48 show different embodiments of this invention. The embodiments are arranged to have an increased air-tightness between the glass tube of the flash tube and the shield plate, because: Insufficient air-tightness causes some electron leak which in turn causes an insufficient arc length and thus lowers the efficiency of the arc discharge. Referring to FIGS. 45 to 48, the welding part between the shield plate 187 and the glass tube 186 is arranged to have a larger joining area either by providing the shield plate 187 with grooves 187a, 187b and 187d or a coarse surface 187c, so that the air-tightness can be enhanced. More specifically, the junction area is increased by providing grooves 187a, 187b and 187d in the fore end part of the shield plate 187 in the cases of FIGS. 45, 46 and 47 or by allowing the fore end part to have a coarse surface 187c in the case of FIG. 48. In these cases, the miniature lamp type flash tube is thus arranged by increasing the area of junction between the end face of the shield plate and the inner surface of the glass tube as much as possible for welding by heating. The arrangement gives an increased degree of air-tightness between the shield plate and the inner parts of the glass tube which are in contact with the shield plate. Therefore, the flash unit is effectively prevented from having any undesirable arc routes other than the normal arc discharge routes, so that its flashing efficiency can be prevented from lowering.

Figure 49:
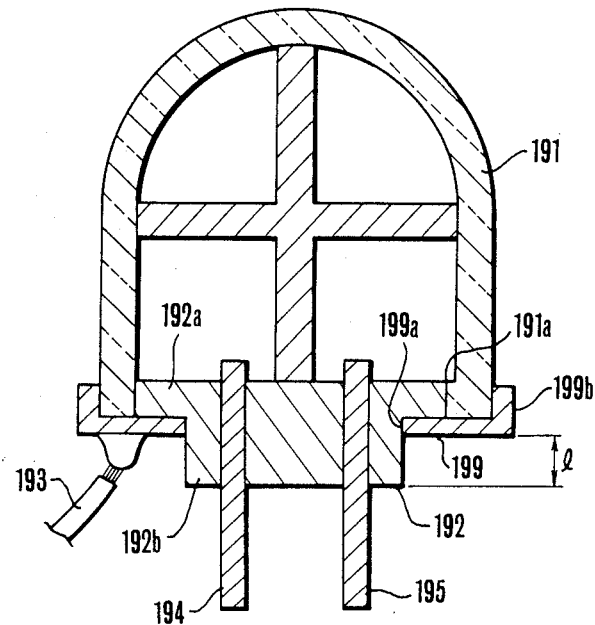
FIGS. 49 and 50 show, in a longitudinal section and an oblique view, a flash tube arranged as another embodiment of this invention.
Figure 50:
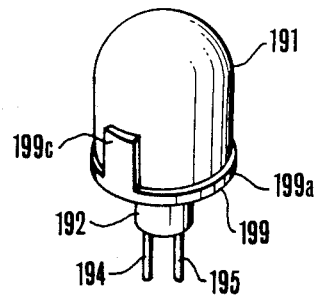

FIGS. 49 to 52 show other embodiments of this invention which are arranged to solve a problem which arises in cases where the bottom plate of the flash tube included in any of the foregoing examples of embodiments is made of some material such as a ceramic material that is poorly adhesive to the glass tube. The use of such a bottom plate of the flash tube necessitates interposition of an adhesive in between the bottom plate and the part of a glass tube abutting upon the bottom plate for the purpose of having a rare gas sealed therein. In addition to that, the peripheral surface of the bottom plate must be arranged to be encompassed with the glass. Therefore, the service life of the flash tube depends much upon the way of applying the adhesive and the secular change of the adhesive. This problem makes the manufacture of the flash unit difficult. The embodiments described below is directed to the solution of this problem:

FIGS. 49 and 50 show one of such embodiments. Referring to FIGS. 49 and 50, a glass tube 191 has its fore end semi-spherically formed and its rear end formed to have an opening part 191a. A circular bottom plate 192 is made of such an insulating material as a ceramic material. A glass tube 191 has a semi-spherical fore end while the other end is formed into an opening part 191a. A bottom plate 192 which is in a circular planar shape is made of an insulating material such as a ceramic material. The bottom plate 192 has a larger diameter part 192a and a smaller diameter part 192b. The diameter of the larger diameter part 192a is a little smaller than the inner diameter of the glass tube 191 while that of the smaller diameter part 192b is smaller than that of the larger diameter part 192a. A cover member 199 is made of a conductive material such as a metal material. The cover member 199 which is in a planar ring shape having a fitting hole 199a in the middle part thereof. A flange part 199b is formed in one body with the cover member 199 in a shape of almost perpendicularly uprising from the periphery of the cover member 199. At least one uprising part 199c is protruding further upward from the flange part 199b. The inner surface of the uprising part 199c is arranged, as shown in FIG. 50, to be in tight contact with a transparent conductive coat which is applied to the outer circumferential surface of the glass tube 191 (FIG. 50). The cover member 199 is thus arranged to serve as a trigger electrode and is electrically connected to a trigger circuit (not shown) via a lead wire 193 which is soldered thereto.

In manufacturing the flash tube which is arranged in this manner, the opening part 191a of the glass tube 191 is positioned, while the glass tube 191 is in a molten state, in a clearance between the periphery of the larger diameter part 192a of the bottom plate 192 and the flange part 199b of the cover member 199 and is then pushed and secured to these parts. In this manner, the glass tube 191 can be reliably secured to the cover member 199 because of the good adhesiveness of the metal material to the glass. Unlike the conventional method, this method obviates the necessity of using any adhesive. Further, since the cover member 199 serves as a trigger electrode as mentioned above, a distance l (see FIG. 49) from the lower surface of the cover member 199 to the lower surface of the smaller diameter part 192b of the bottom plate 192 is preferably set to be relatively long for the purpose of avoiding sparks among the cover member 199, a cathode electrode 194 and an anode electrode 195.

Figure 51:
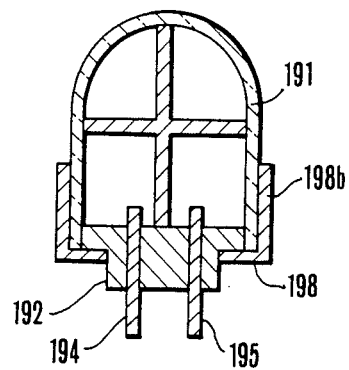
FIG. 51 is a sectional view showing an example of modification of the flash tube of FIG. 49.

FIG. 51 shows by way of example a modification of this embodiment. In this case, the circular flange part 198b of the cover member 198 is arranged to extend further upward over the whole circumference of the cover member 198 and thus to serve also as the triggering uprising part in place of the uprising part 199c of FIG. 50. With the exception of this, the rest of arrangement of this modification is similar to the embodiment shown in FIGS. 49 and 50. In FIG. 51, the same parts as those shown in FIGS. 49 and 50 are indicated by the same numerals.

Figure 52:
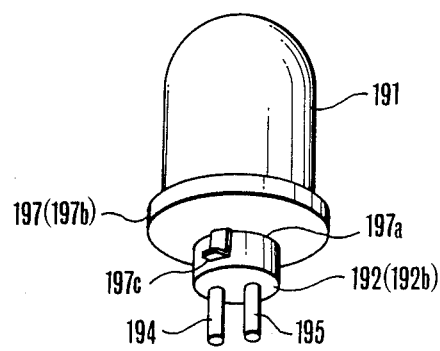
FIG. 52 is an oblique view showing another example of modification of the same flash tube in its entirety.

FIG. 52 shows another modification of the same embodiment. In that modification, a tongue 197c is formed in one body with the cover member 197 to continuously extend downward from a part located near to the fitting hole 197a provided in the middle of the cover member 197. The lower end of the tongue 197c is rectangularly bent outward. The above stated lead wire 193 can be dispensed with by connecting this tongue 197c, for example, directly to a part of a trigger circuit which is not shown. With the exception of this point, the rest of arrangement of that modification is the same as the embodiment shown in FIGS. 49 and 50. In FIG. 52, the same parts as those shown in FIGS. 49 and 50 are indicated by the same reference numerals. Further, the lower face of the tongue 197c is of course arranged to be located above the lower surface of the smaller diameter part 192b of the bottom plate 192. To ensure this, the thickness of the smaller diameter part 192b, in this case, is arranged to be preferably thicker than in the above stated two cases.

In the embodiments described with reference to FIGS. 49 to 52, the anode and cathode electrodes are arranged to be carried by an insulating material such as a ceramic material; and a cover member which is made of a conductive material and arranged to serve as a trigger electrode by abutting on the conductive coat of the glass tube is secured to one end of the glass tube. This arrangement obviates the necessity of use of an adhesive and arranging the glass round the bottom plate. Therefore, the fluctuations in service life among the flash tube products can be lessened and the cost of the flash tube can be lowered by simplified manufacturing processes. The embodiments, therefore, have a very high degree of utility.

Figure 53:
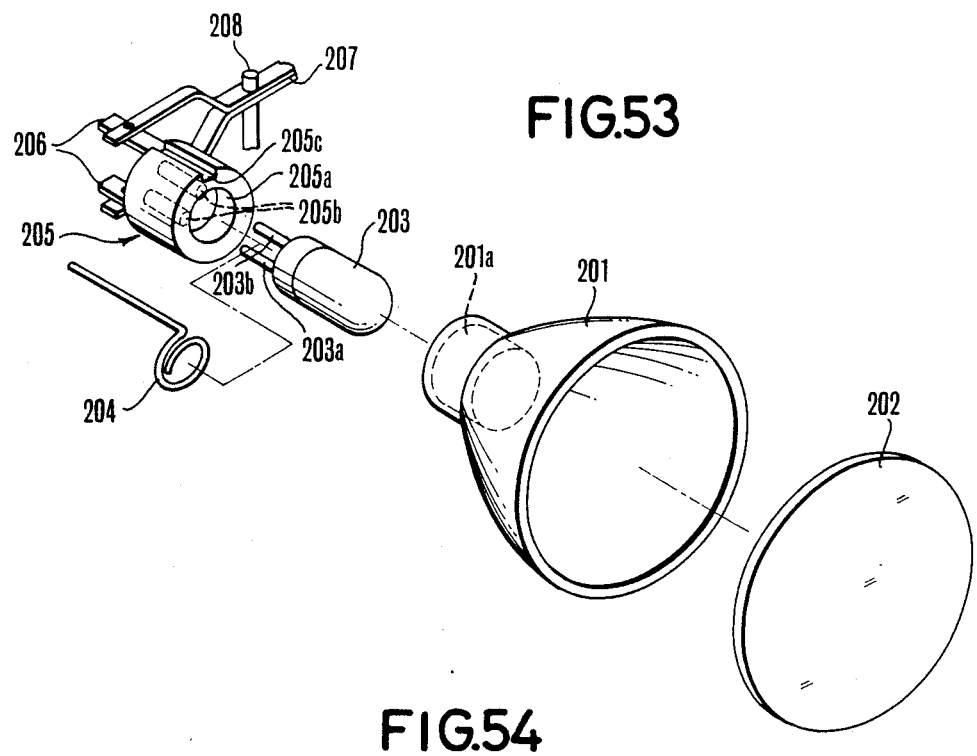
FIG. 53 is an exploded view showing an electronic flash unit arranged as a further embodiment of this invention.
Figure 54:
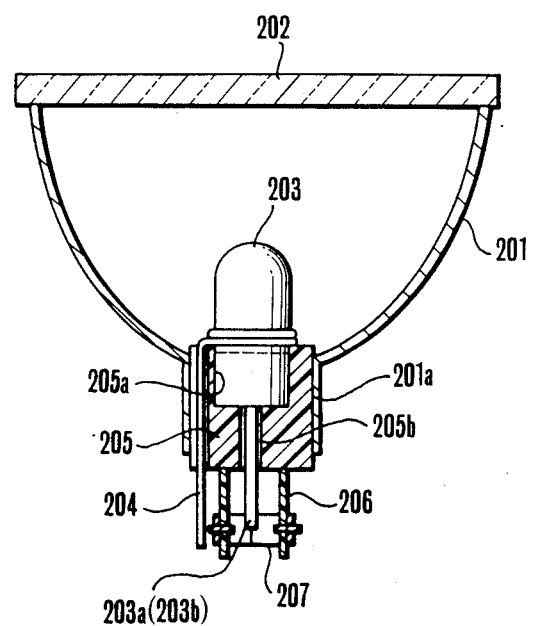
FIG. 54 is a sectional side view of the same flash unit as in an assembled state.

FIG. 53 shows in an exploded view another flash unit arranged according to this invention. FIG. 54 is a sectional view showing the same flash unit as in an assembled state. Referring to FIGS. 53 and 54, a reflector 201 which is made of a metal material such as aluminum has a circular opening. A protector 202 which has a Fresnel lens part (not shown) is secured to the front of the reflector 201 by means of a member which is not shown. A holder which will be described later and arranged to carry a miniature lamp type flash tube 203 is inserted into a guide hole 201a formed in the reflector 201. The flash tube 203 is provided with a cathode electrode terminal 203a and an anode electrode terminal 203b. A transparent conductive coat which mainly comprises tin oxide is applied to a part of the outer circumferential surface of the flash tube 203. A trigger line 204 is made of a spring material and has a ring shaped part. The diameter of the ring shape of the trigger line 204 is arranged to be a little smaller than the outer diameter of the above state flash tube 203. The ring shaped part of the trigger line 204 is fitted on the transparent conductive coat which is applied to the outer circumferential surface of the flash tube 203. The rear end of the trigger line 204 long extends rearward in an arm-like shape. To this arm-like part of the trigger line 204 is soldered a triggering lead wire which comes from a flash circuit. A cylindrical holder 205 is made of an insulating synthetic resin material. The holder 205 is provided with an opening 205a and through holes 205b which are formed within the holder 205. The above stated flash tube 203 is secured to the opening 205a with some adhesive or the like. At that time, the cathode and anode electrode terminals 203a and 203b are inserted into the through holes 205b respectively. A recess 205c is provided in the outer circumferential surface of the holder 205 for guiding backward the arm-like part of the trigger line 204. Further, plates 206 which are made of an insulating material are secured to the rear side of the holder 205. Further, a lever 207 which is made of an insulating material is arranged to cause the holder 205 to slide within a hole part 201a of the reflector 201 in such a manner that the flash tube 203 which is carried by the holder 205 is thus movable back and forth relative to the protector 202. In other words, the lever 207 is provided for a zooming purpose and is turnable on a shaft 208. One end of the lever 207 pivotally carries the above stated plates 206 while the other end is connected to a photo taking lens zoom device which is not shown.

With the embodiment arranged in the above stated manner, when a zooming operation is performed on the photo taking lens to cause the lens to begin to move in the near-distance direction, the lever turns round clockwise on the shaft 208 in response to the zooming move of the lens. The turning movement of the lever 207 is transmitted in the form of a linear motion to the holder 205 via the plates 206. As a result, the holder 205 which carried the flash tube 203 is guided by the guide hole 201a of the reflector 201 to move toward the protector 202 which has a Fresnel lens part. This widens the illuminating angle of the flash unit so that apposite illumination can be obtained for the specific flash photographing operation. When the photo taking lens begins to shift its position toward the infinity distance position, the lever turns round counterclockwise on the shaft 208 in response to the shift of the lens. As a result, the holder 205 which carries the flash tube 203 moves away from the protector 202 being guided by the guide hole 201a of the reflector 201. The illuminating angle of the flash unit, this time, becomes narrower.

Figure 55:
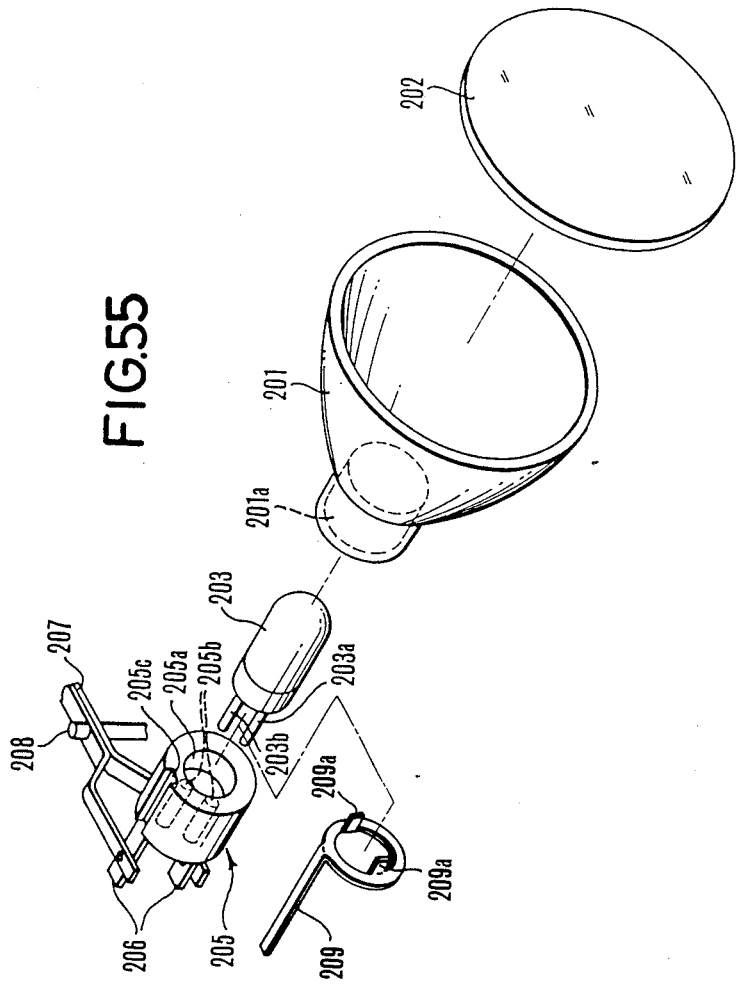
FIG. 55 is an exploded view showing by way of example a modification of the flash unit of FIG. 53.

FIG. 55 shows by way of example a modification of the embodiment shown in FIG. 53. In this case, the trigger line 204 of FIG. 53 which is made of a spring material is replaced with a trigger leaf spring 209 which is made of a leaf spring material. With the exception of that point, the rest of the modification is identical with the arrangement of the embodiment shown in FIG. 53. In FIG. 55, the same parts as those shown in FIGS. 53 and 54 are indicated by the same reference numerals. Referring to FIG. 55, the trigger leaf spring 209 includes a doughnut shaped part in the middle thereof and two resilient piece parts 209a protruding from the inner side of the middle doughnut shaped part. The two resilient piece parts 209a is arranged to be in contact with the outer wall surface of the spherical fore end part of the flash tube 203, which has a transparent conductive coat applied to its outer wall surface at the spherical fore end part. The spherical fore end part is thus arranged to be pinched and pushed from two opposite sides by the two resilient piece parts of the trigger leaf spring 209. In other words, the leaf spring 209 is carried by the flash tube in a state of being fitted on the latter. A triggering lead wire which comes from a flash circuit is soldered to the arm part of the trigger leaf spring 209.

Figure 56:
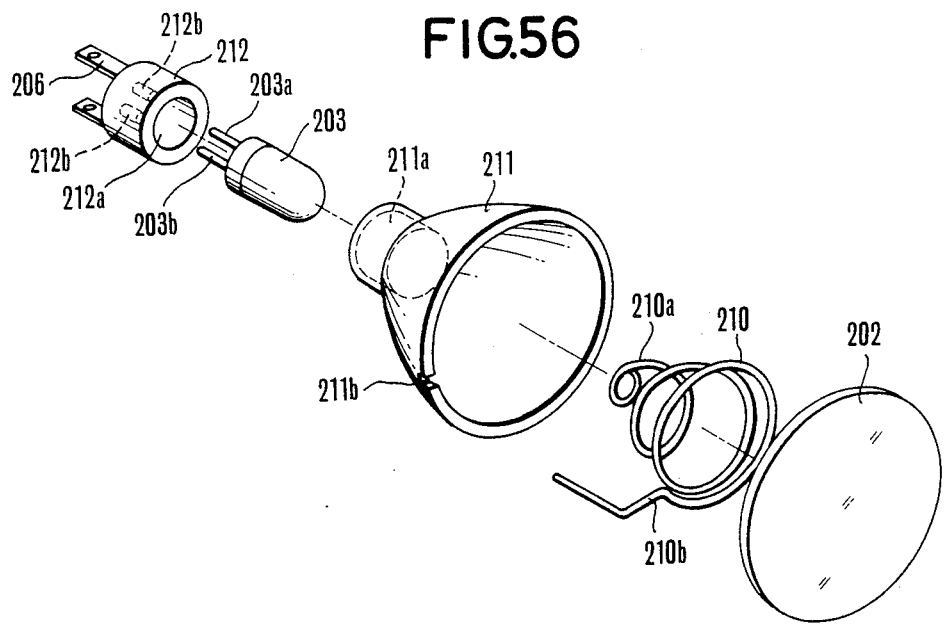
FIG. 56 is an exploded view showing another modification of the flash unit of FIG. 53.

FIG. 56 shows another example of modification of the embodiment shown in FIG. 53. The following description of the modification is limited to the point in which the modification differs from the embodiment shown in FIG. 53: In FIG. 56, the same parts as those of FIG. 53 are indicated by the same reference numerals. The lever 207 and the shaft 208 which pivotally carries the lever are arranged in the same manner as in the cases of FIGS. 53 to 55 though they are not shown in FIG. 56.

Figure 57:
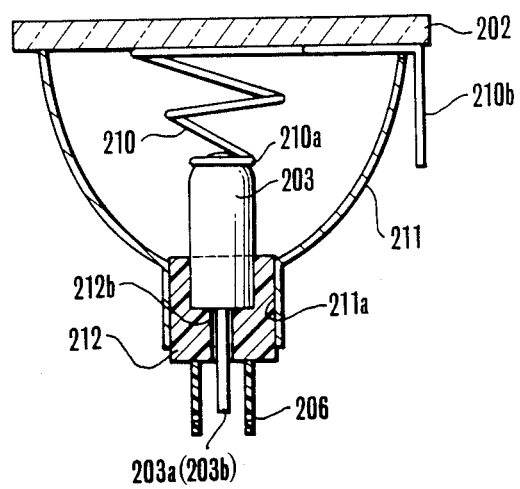
FIG. 57 is a sectional side view showing the same modification as in an assembled state.

Referring to FIG. 56, a trigger line 210 which is made of a spring material is formed into a bamboo-shoot like shape. The fore end part 210a of the trigger line 210 is arranged to be in contact with the spherical fore end part of the flash tube 203. The other end of the trigger line 210 is formed in an L shape and is fitted into a notched part 211b provided in the opening edge of the reflector 211 in such a way as to position the trigger line 210. The trigger line 210 is thus kept in a position in between the protector 202 and the reflector 211 as shown in FIG. 57. Unlike in the cases of FIGS. 53 to 55, the flash tube 203 is secured to the inside of an opening 212a of a holder 212 which requires no recessed part for guiding the trigger line 210 rearward. The flash tube 203 and the trigger line 210 are kept in contact with each other by the spring force of the trigger line 210. This ensures a reliable triggering action.

In this case, the triggering action can be initiated at a point away from the cathode and anode electrode terminals 203a and 203b with the transparent conductive coat applied just to the outer wall surface of the spherical fore end part. This is an advantage in terms of insulation. Further, the above stated arrangement obviates the necessity of winding a trigger line round the flash tube as in the case of the conventional flash unit. That is another advantage in terms of assembly work efficiency. A member which is not shown is arranged to limit to a given extent the downward movement of the holder 212 from the guide hole 211 from the guide hole 211a of the reflector 211.

Figure 58:
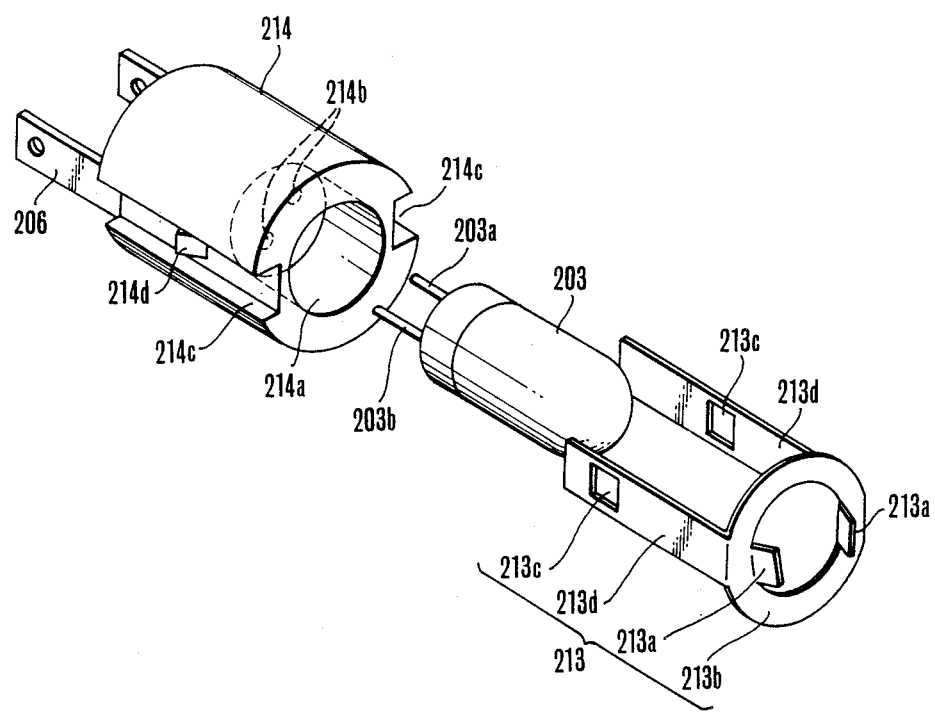
FIG. 58 is an exploded view showing further example of modification of the flash unit shown in FIG. 53.
Figure 59:
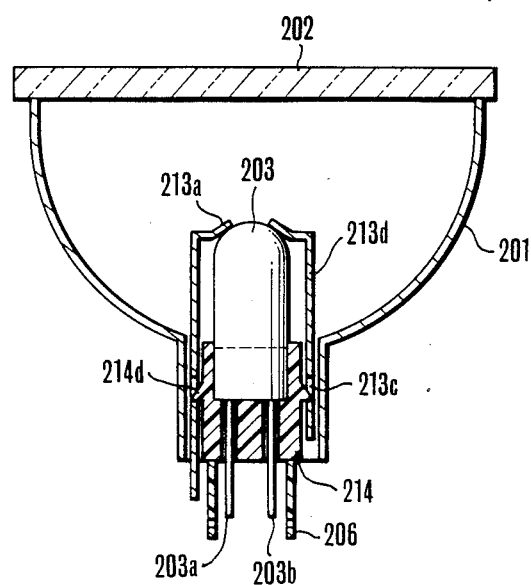
FIG. 59 is a sectional side view of the same modification as in an assembled state.

FIG. 58 shows a further example of modification of the embodiment shown in FIG. 53. The following description of this modification is also limited to the point in which it differs from the arrangement shown in FIG. 53. In FIG. 58, the same parts as those shown in FIGS. 53 and 54 are indicated by the same reference numerals. The lever 207 and the shaft 208 which pivotally carries the lever 207 are omitted from the illustration. FIG. 59 shows the modification in a sectional view as in an assembled state.

Referring to FIGS. 58 and 59, a trigger leaf spring 213 which is made of a leaf spring material includes a doughnut part 213b. The doughnut part 213b is provided with resilient pieces 213a which protrude forward from the fore end of the trigger leaf spring 213. The doughnut part 213b is further provided with leg parts 213d each of which is provided with a fitting hole 213c. A holder 214 which is arranged to be inserted in a guide hole 201a of a reflector 201 is provided with recessed parts 214c formed on opposite sides of the outer circumferential surface thereof. The width of the recessed parts (or grooves) 214c is a little wider than the leg parts 213d of the trigger leaf spring 213. A tapered projection 214d is provided within each of the recessed parts 214c. The tapered projections 214d are arranged to be fitted into the fitting holes 213c which are formed in the leg parts 213d of the trigger leaf spring 213.

The flash tube 203 is mounted in the following manner: The flash tube 203 is first inserted into the opening 214a of the holder 214 and is pushed against the bottom face of the opening 214a. With the flash tube 203 in this state, the trigger leaf spring 213 is pushed onto the flash tube 203 from above. The resilient pieces 213a which are disposed on the inner side of the doughnut part 213b then come to abut on the spherical fore end part of the flash tube 203. Then, when the trigger leaf spring 213 is further and strongly pushed onto the flash tube, the fitting holes 213c formed in the leg parts 213d of the trigger leaf spring 213 come to cause the projections 214d of the holder 214 to fit into them. By this, the flash tube 203 is firmly carried by the holder 214 with the aid of the trigger leaf spring 213 as shown in FIG. 59.

This embodiment obviates the necessity of fixing the flash tube 203 and the holder 214 to each other by means of an adhesive or the like. They can be secured to each other by just inserting the trigger leaf spring 213 from the front side in the so-called click-fitting manner. This greatly facilitates assembly work. Further, since the trigger leaf spring 213 also serves as a trigger line, the number of necessary parts can be lessened by the arrangement. Further, while the trigger leaf spring 213 is arranged to have two leg parts 213d disposed in confronting positions, the number of leg parts of course may be increased to three or more than three. In that event, the number of the recessed parts 214c of the holder 214 must be increased accordingly.

In the embodiments described with reference to FIGS. 53 to 59 in the foregoing, the miniature lamp type flash tube 203 may be arranged in the same manner as in the cases of the preceding examples of embodiment.

In accordance with the arrangement of the embodiments shown in FIGS. 53 and 59, the miniature lamp type flash tube 203 is arranged to be mounted on the holder which is movably inserted in the guide hole provided in the middle part of the reflector. The holder is thus arranged to be movable back and forth relative to the protector. Therefore, a zooming action can be performed according to a shift of the position of the photo taking lens despite of the very simple flash unit arrangement.

Figure 60:
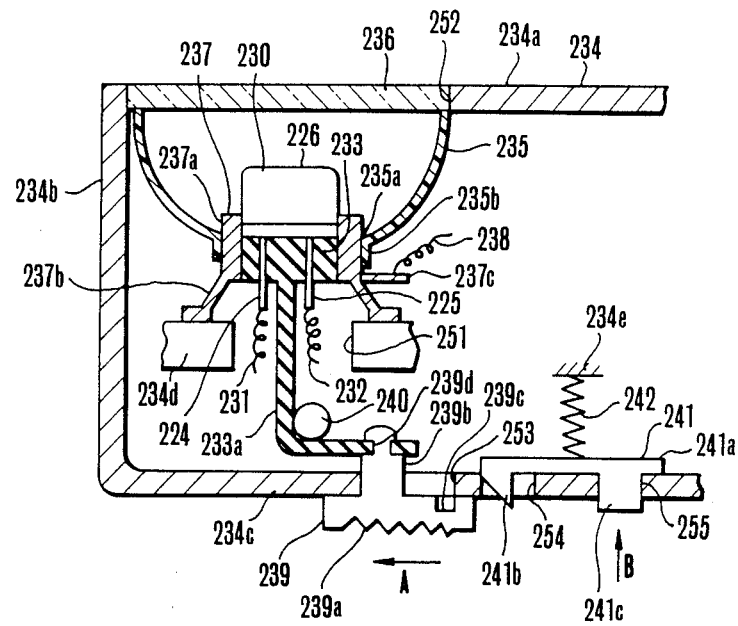
FIG. 60 is a sectional view showing the essential parts of a flash tube carrying arrangement of a further embodiment of this invention.
Figure 61:
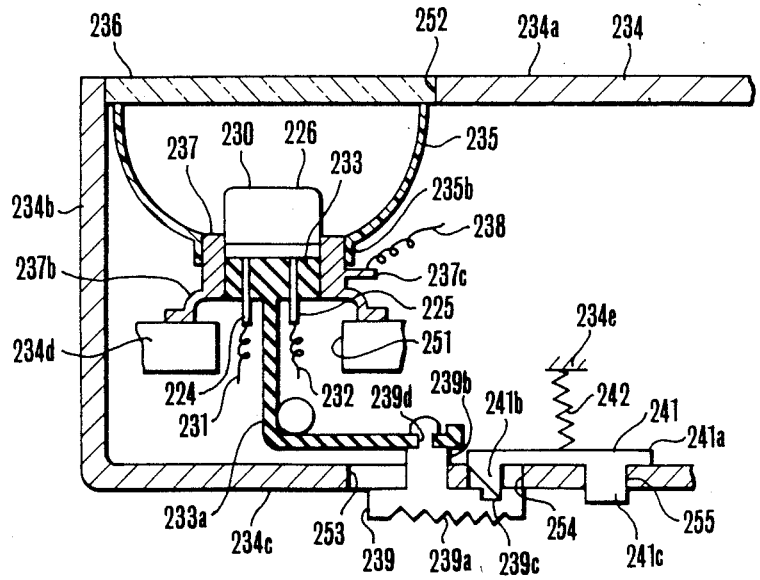
FIG. 61 is a sectional view showing the essential parts of the same embodiment as in a state of operating in a different manner from the state thereof shown in FIG. 60.
Figure 62:
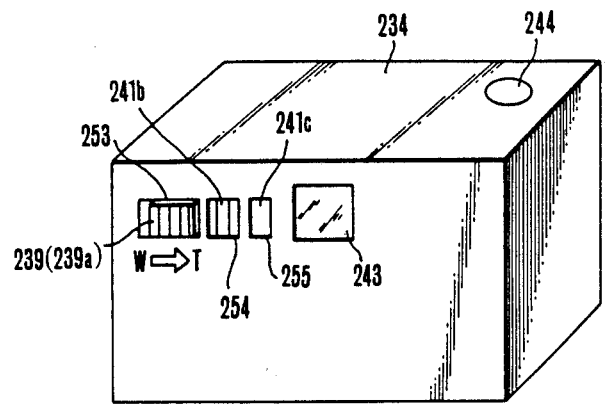
FIG. 62 is an oblique view showing a camera including the arrangement of FIG. 60 as viewed from behind.

The following description deals with a further embodiment of this invention: FIG. 60 is a sectional view showing the essential parts of a carrying arrangement provided according to this invention within a camera for carrying a miniature lamp type flash tube. FIG. 61 is a sectional view showing the same arrangement as in a different operating state. FIG. 62 is an oblique view schematically showing the camera as viewed from behind.

Referring to FIGS. 60 to 62, a miniature lamp type flash tube 230 is arranged in the same manner as any of the preceding examples of embodiment described in the foregoing. The flash tube 230 has cathode and anode electrodes 224 and 225. The electrodes 224 and 225 are connected via lead wires 231 and 232 to an electric circuit which is not shown. A cylindrical holding member 233 is arranged to have about the same diameter as the outer diameter of a glass tube 226 of the flash tube 230. The holding member 233 stably carries the flash tube 230 by allowing the cathode and anode electrodes 224 and 225 to pierce through it. Further, the holding member 233 is made of a flexible insulating material such as an insulating rubber material. The member 233 includes a leg part 233a which is formed in one body with the member 233 to extend downward from one side of the member opposite to the flash tube mounting side thereof. A camera body 234 includes a front cover 234a, side covers 234b, a rear cover 234c and inner structural members including a first support member 234d and a second support member 234e. The first support member 234d has a hole part 251 which allows the above stated lead wires 231 and 232 and the leg part 233a to be inserted therein. A reflector 235 is made of, for example, a synthetic resin material and has such a bright member as aluminum or the like attached to the inner surface thereof. A protector 236 is disposed in front of the reflector 235. In this specific embodiment, the protector 236 is fitted into an aperture 252 of the front cover 234a and is almost flush with the surface of the front cover 234a. A circular opening 235a is provided in the rear part (lower side as viewed on FIG. 60) of the reflector 235. A flange part 235b of the reflector 235 extends from the circular opening 235a approximately in parallel to the optical axis of the flash tube. It goes without saying that the reflector 235 is attached to the camera body 234 by some means which is not shown. A sliding member 237 which is made of a flexible conductive material such as a conductive rubber material includes a hollow cylindrical base part 237a; leg parts 237b which are formed in one body with the base part 237a and are in elastic contact with the above stated first support member 234d; and a connection part 237c which protrudes from near a boundary part between the base part 237a and one of the leg parts 237b. The sliding member 237 is arranged to carry the flash tube 230 by the inner side of the base part 237a and to have the outer side of the base part movably fitted into the inner side of the flange part 235b. The sliding member 237 abuts on a transparent conductive coat applied to the outer circumferential surface of a glass tube 226 of the flash tube. Therefore, the slide member 237 is also arranged to serve as a trigger electrode. A lead wire 238 which is attached to the connection part 237c of the sliding member 237 is connected to an electric circuit which is not shown. A slide knob 239 includes an operation part 239a which has a roughened antislip surface and a shaft part 239b. Further, a groove part 239c is formed on the reverse side of the operation part 239a;

and a lock part 239d is formed in the neighborhood of the free end of the shaft part 239b. A direction change-over member 240 is erected at a suitable part of the camera body 234 to upraise perpendicular to the paper surface of the drawing FIG. 60. The leg part 233a is bent almost rectangularly to the right by the direction change-over member 240. The end of the rectangular bent portion of the leg part 233a is secured to the lock part 239d of the above stated shaft part 239b of the slide knob. A slot 253 is provided in the rear cover 234c. The shaft part 239b is inserted in the slot 253. The resilient force of the leg part 237b is thus arranged to urge the slide knob 239 in the direction of arrow A to keep it normally in a position as shown in FIG. 60. Further, holes 254 and 255 are provided in the rear cover 234c close to the above stated slot 253 (on the right-hand side as viewed on FIG. 60). A lock member 241 consists of a base part 241a which is arranged to normally abut on the inner side of the rear cover 234c; a triangular lock part 241b which is formed in one body with one end of the base part 241a with its lower end formed to have an acute angle; and a protrudent operation part 241c which is located close to the other end of the base part 241a. The lock part 241b is fitted into the hole 254 while the operation part 241c is fitted into the hole 255. A resilient member 242 (or a compression spring in the case of this embodiment) is set up between the above stated second support member 234e and the base part 241a. The lock member 241 is thus urged by the force of this resilient member 242 to abut on the inner side of the rear cover 234c. Referring now to FIG. 62, the illustration includes a known view finder window 243 and a shutter release button 244.

The embodiment which is arranged as described above operates as described in the following: FIG. 60 show the embodiment as in a state of performing a normal photographing operation (or wide-angle photographing). Under this condition, the flash tube 230 is set in a position relative to the reflector 235 to give a relatively wide illuminating angle in accordance with the focal length of the photo taking lens which is not shown. In the event of tele-photography, the slide knob 239 is manually slid in a direction reverse to the direction of arrow A of FIG. 60 by applying a finger to the operation part 239a. The slide knob then comes to a stop with the above stated lock part 241b coming to engage the groove part 239c of the knob 239 as shown in FIG. 61. In this instance, the leg part 233a is pulled downward. Therefore, the leg part 237b of the slide member 237 elastically deforms and the flash tube 230 moves downward relative to the reflector 235. In other words, the flash tube 230 is retracted rearward relative to the reflector 235. The illumination angle thus becomes narrower to enable the light to come over a longer distance.

In shifting the state of the embodiment back to the normal photographing state, the operation part 241c of the lock member 241 is pushed upward, as viewed on FIG. 61, against the urging force of the resilient member 242. This pushing operation disengages the lock part 241b from the groove part 239c. Then, the slide member 237 and the flash tube 230 which is arranged in one body with the slide member 237 are moved upward back to their positions shown in FIG. 60 by the resilient force of the leg part 237b. Meanwhile, in response to such a switching operation of the embodiment, the photo taking lens which is not shown of course shifts its position either to a wide-angle position or to a telephoto position.

Despite its simple structural arrangement, the embodiment described above is capable of changing its illuminating angle by simply moving the flash tube forward or backward approximately in parallel to the optical axis when a change takes place in the photo taking angle of view. Further, since the resilience of the leg part of the sliding member is utilized in moving the flash tube back and forth, no drive source such as a motor is required for that purpose. The embodiment is simple in structural arrangement and permits reduction in cost and weight.

FIGS. 63 to 70 show a different embodiment of this invention. In this case, the flash unit is arranged to be capable of obtaining adequate light distributing characteristics both in performing a full frame size photographing operation and in the event of a half frame size photographing operation.

Figure 63:
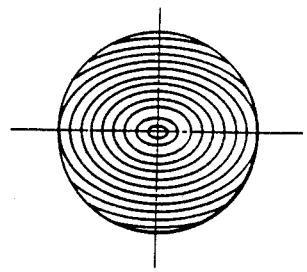
FIGS. 63 to 66 show the Fresnel shapes of protectors to be used in the embodiments shown in FIGS. 67 to 70.
Figure 64:
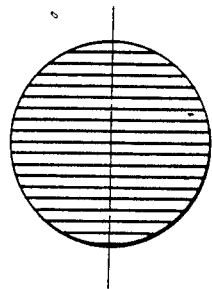
Figure 65:
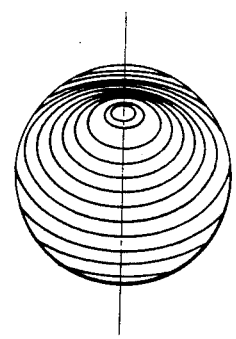
Figure 66:
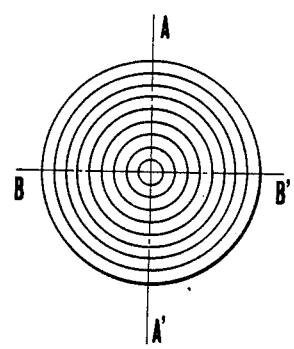
Figure 66A:
FIGS. 66(A) and 66(B) are sectional views taken along lines A-A' and B-B' of FIG. 66.
Figure 66B:
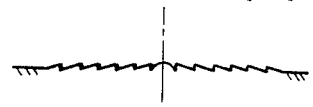

FIG. 63 shows by way of example the Fresnel lens shape of a transmissive panel (or a protector) to be used for the embodiment. In the case of FIG. 63, the Fresnel shape is elliptical having a coarse vertical pitch and the panel has a strong refracting power. FIG. 64 shows another Fresnel shape of the above stated panel. In this instance, Fresnel shape exists only in the vertical direction to give a refracting power only in the vertical direction. FIG. 65 shows a further example of the Fresnel shape. The panel has an upper convergent elliptical Fresnel shape thus giving a strong upward refracting power. FIG. 66 shows a further example of the Fresnel shape. In this case, the panel has a circular Fresnel shape. FIG. 66(A) shows it in a sectional view taken on line A-A' of FIG. 66 while FIG. 66(B) shows it in a sectional view taken on line B-B' of FIG. 66. As apparent from these sectional views, the refracting power of the panel or protector in this case is stronger in the vertical direction than in the lateral direction.

The Fresnel shapes of the panels or protectors shown in FIGS. 63 and 66 enable the flash unit to have a greater light distributing ratio in the lateral direction than in the vertical direction in respect of a rotationally symmetric light distributing characteristic. It is also possible to conversely vary a vertical-to-lateral light distributing ratios by turning round the transmissive panel 90 degrees on the flashing optical axis.

Further, with the vertical-to-lateral light distributing ratios having been equalized, the light distributing range can be lessened by shifting the flash tube, which serves as a projection light source through the above stated panel, toward the bottom of the reflector.

Figure 67:
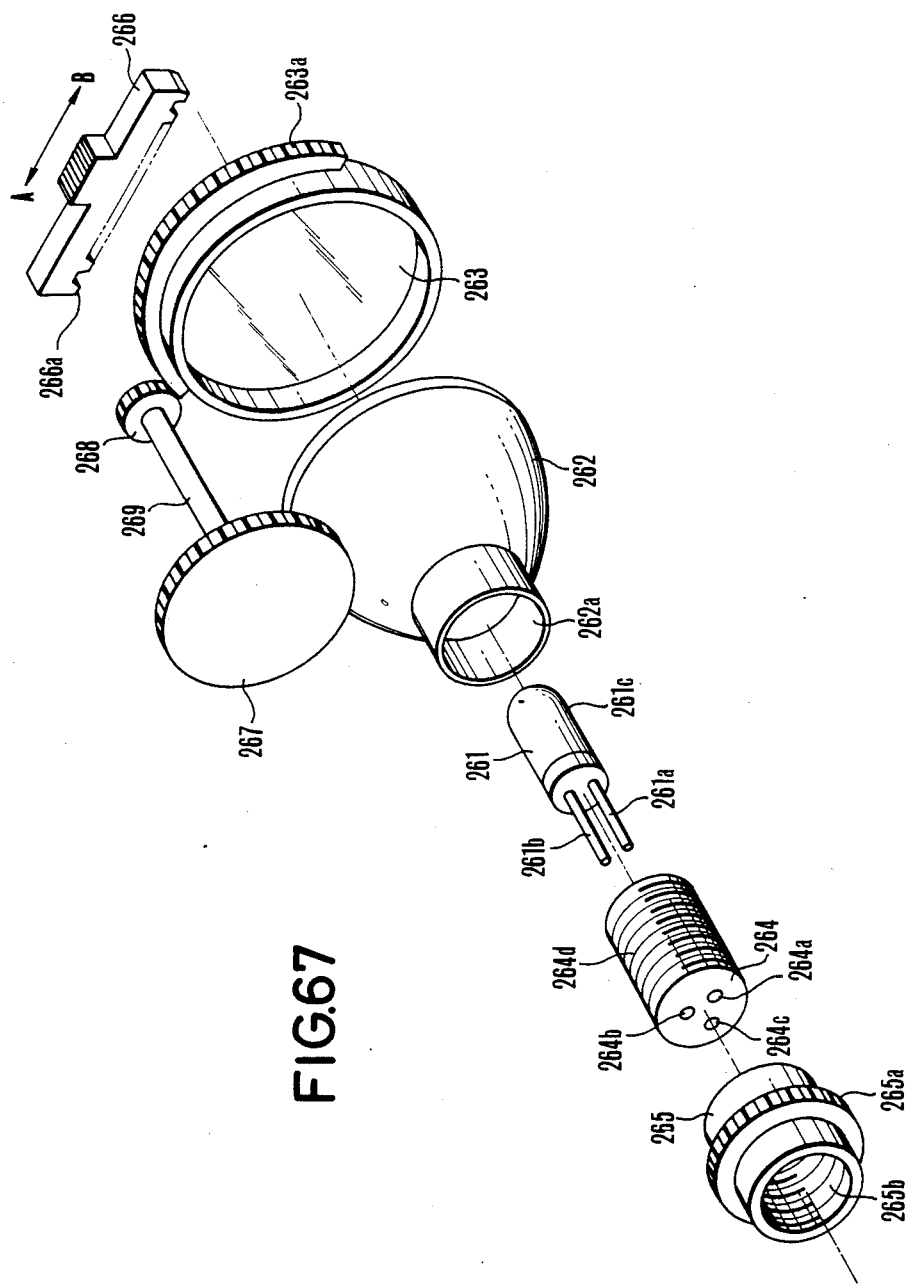
FIG. 67 is an exploded view of a flash unit arranged as a further embodiment of this invention.

FIG. 67 shows in an exploded view a flash unit arranged as the above stated embodiment of this invention. Referring to FIG. 67, a miniature lamp type flash tube 261 which is arranged in the same manner as in any of the embodiments described in the foregoing has a cathode electrode terminal 261a and an anode electrode terminal 261b. To the outer wall surface is applied a transparent conductive coat 261c for triggering. A reflector 262 has a circular opening. The inner surface of the reflector 262 serves as a reflecting mirror and is a quadratic surface which is rotationally symmetric relative to the flashing optical axis. The bottom part of the reflector 262 is in a cylindrical shape having a fitting hole 262a. A protector 263 is rotatably fitted on the front part of the reflector 262. The protector 263 is arranged to be in one of the Fresnel shapes shown in FIGS. 63 to 67 and has a gear part 263a formed along its periphery. An inner holder 264 is arranged to carry the flash tube 261 with the tube fitted therein. The inner holder 264 has a male screw part 264d which is formed along the outer circumference thereof and through holes 264a and 264b which are provided for insertion of the cathode and anode electrode terminals 261a and 261b of the flash tube 261. The inner holder 264 has another through hole 264c arranged to guide rearward a trigger line which is not shown but is in contact with the transparent conductive part 261c of the flash tube 261.

An outer holder 265 is arranged to be rotatably fitted into the fitting hole 262a of the reflector 262. The outer holder 265 has a gear part 265a formed along the outer circumference thereof and a female thread part arranged along the inner circumference thereof to engage the male screw part 264d of the inner holder 264.

A change-over member 266 is arranged to switch the photographing mode of the camera between a full-frame size mode and a half-frame size mode. The change-over member 266 is provided with a rack gear 266a which engages the gear part 263a of the protector 263. Further, the change-over member 266 selects in a known manner an aperture which determines the size of the picture plane of the camera and also switches the film feeding mode of the camera between the full-frame mode and a half-frame mode. A first gear 268 and a second gear 267 are arranged in one unified body via a shaft 269. The first gear 268 engages the gear part 263a of the protector 263. The second gear 267 engages the gear part 265a of the outer holder 265. Both the flash tube 261 and the inner holder 264 are not rotating relative to the reflector 262. A member which is not shown is arranged to guide the cathode and anode terminals 261a and 261b of the flash tube in such a way as to allow them only to linearly move backward or forward.

The flash unit which is arranged as described above operates in the following manner: In changing the size of the photographing picture plane of the camera from the half-frame size to the full-frame size, the change-over member 266 is manually moved in the direction of arrow A from its position as shown in FIG. 67. This move of the change-over member 266 causes the protector 263 to turn round 90 degrees counterclockwise on the flashing optical axis. Under that condition, the ratio between the vertical light distribution and the lateral light distribution becomes 1:1.5 which is for the full-frame size mode. In response to the rotation of the protector, the first and second gears 268 and 267 turn clockwise to cause the outer holder 265 to turn round counterclockwise. Then, since the inner holder 264 is not allowed to turn round, the counterclockwise turning movement of the outer holder 265 causes the inner holder 264 to linearly move backward relative to the outer holder. Accordingly, the flash tube 261 move forward relative to the reflector 262 thus to widen the distributing range of the flash light.

In the event of switching from the full-frame size mode over to the half-frame size mode, the changeover member 266 is moved in the direction of arrow B. The protector 263 then turns round 90 degrees clockwise. The outer holder 265 turns round also clockwise. The inner holder 264 this time moves backward relative to the reflector 262. With the flash tube 261 thus pulled inward, the range of flash light distribution becomes narrower. Such being the arrangement of the embodiment, the guide number of the flash light is greater for the half-frame mode than for the full-frame mode. Further, with the half-frame size mode selected, the protector 263 turns round 90 degrees from its position of the full-frame size mode. Therefore, the light distributing characteristic relative to the flashing optical axis obtained in the full-frame size mode congruently turns 90 degrees as it is thus to give a vertical-to-lateral ratio apposite to the half-frame size mode.

Figure 68:
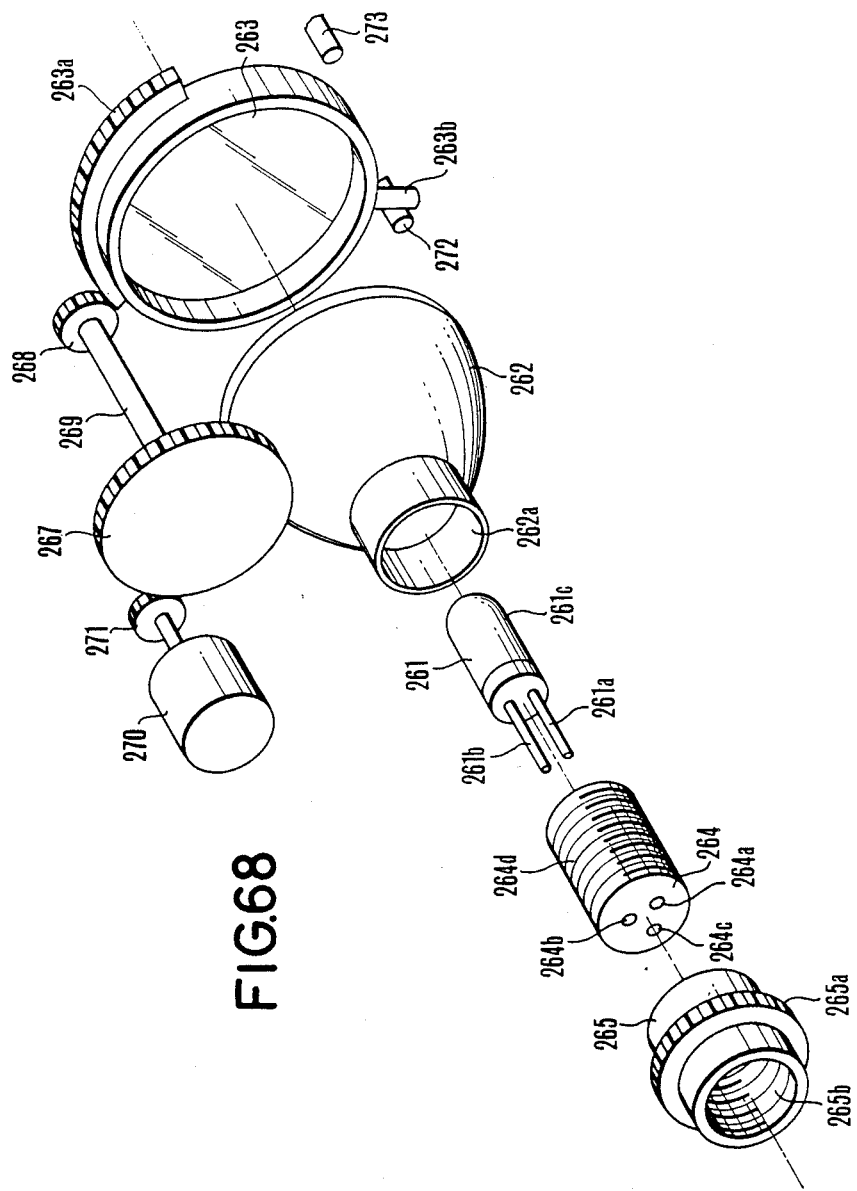
FIG. 68 is an exploded view showing a modification of the flash unit of FIG. 67.

FIG. 68 shows by way of example a modification of the embodiment shown in FIG. 67. In FIG. 68, the same parts as those shown in FIG. 67 are indicated by the same reference numerals and the details of them are omitted from the following description. Referring to FIG. 68, a motor 270 is provided with a pinion 271. The pinion 271 engages the second gear 267. The motor 270 is thus arranged to rotate forward or backward according to an operation performed on a full-half change-over operation switch which is not shown. FIG. 68 shows the modification as in the half-frame size mode. In this mode, the protector 263 is kept in a position having a projection 263b thereof abutting on a first stopper 272. When the half-frame size mode is switched over to the full-frame size mode, the motor 270 rotates counterclockwise. Accordingly, the protector 263 begins to rotate counterclockwise and the projection 263b thereof comes to abut on a second stopper 273. When the projection 263b abuts on the second stopper 273, a timer circuit which is not shown cuts off a current supply to the motor. The protector thus turns round 90 degrees to make the vertical-to-lateral ratio of the light distribution apposite to the full-frame size photographing mode.

Meanwhile, since the flash tube 261 is arranged to linearly move relative to the reflector in the same manner as in the case of the embodiment shown in FIG. 67, the illuminating angle also changes from the half-frame size mode angle over to the full-frame size mode angle.

Figure 69:
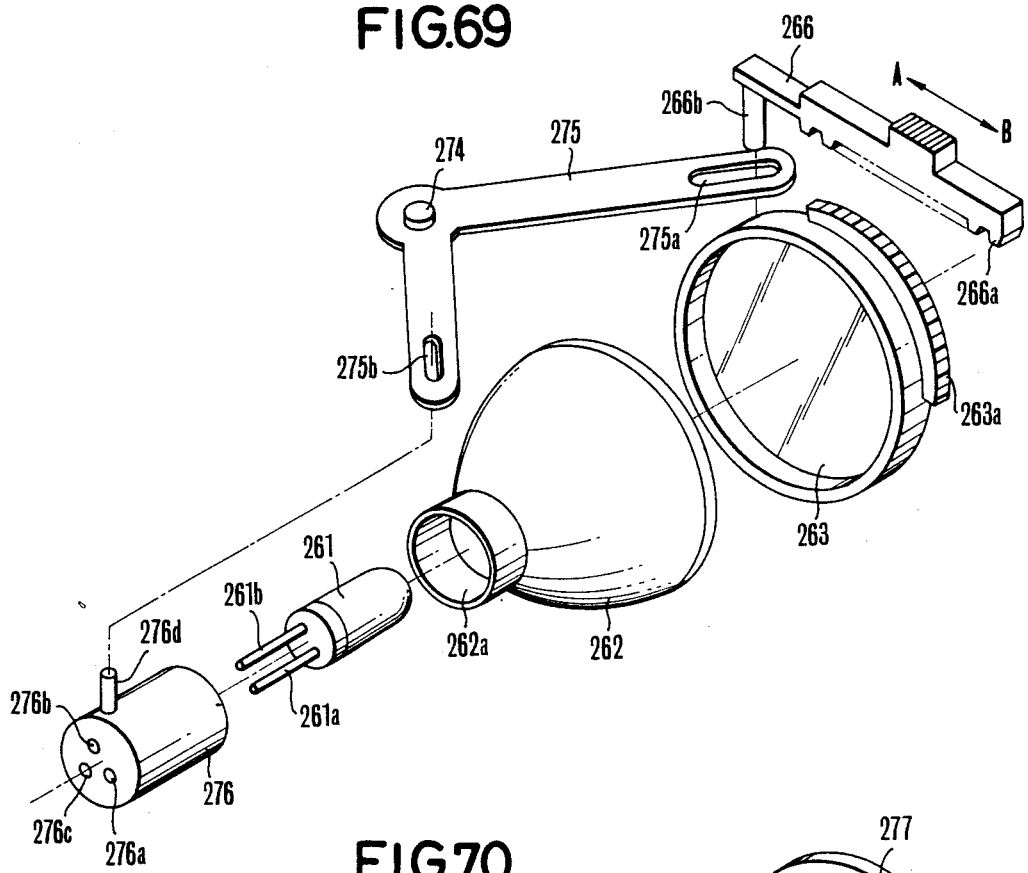
FIG. 69 is an exploded view showing another modification example of the same flash unit.

FIG. 69 shows another example of modification of the embodiment shown in FIG. 67. In FIG. 69, the same parts as those shown in FIG. 67 are indicated by the same reference numerals and the details of them are omitted from the following description: A holder 276 is arranged to carry the flash tube 261 with the flash tube inserted therein. The holder 276 is fitted into the fitting hole 262a of the reflector 262. A transmission pin 276d is provided on the holder 276 in the rear part thereof. The holder 276 is provided further with through holes 276a, 276b and 276c in the bottom part thereof. The change-over member 266 is provided with an engaging pin 266b which extends downward from the fore end lower side of the member 266. An L shaped transmission lever 275 is pivotally carried by a shaft 274 and is swingable on the shaft 274. The lever 275 is provided with first and second slots 275a and 275b which are formed in the fore ends of the arm parts of the level. With the modification arranged in this manner, it operates as follows: When the change-over member 266 is moved in the direction of arrow A, the half-frame size photographing mode is changed over to the full-frame size photographing mode. Then, the protector 263 turns round-90 degrees counterclockwise. At the same time, the transmission lever 275 also turns round counterclockwise on the shaft 274. This causes the holder 276 to linearly move forward relative to the reflector 262. As a result of this, the light distributing characteristic of the modification becomes apposite to the full-frame size mode. In case that the half-frame size mode is selected by moving the change-over member in the direction of arrow B, the protector 263 turns round 90 degrees from its position of the full-frame size mode to make the the vertical-to-lateral ratio of the light distribution apposite to the half-frame size mode. At the same time, the holder 276 moves rearward to make the illuminating angle also suitable for the half-frame size mode.

Figure 70:
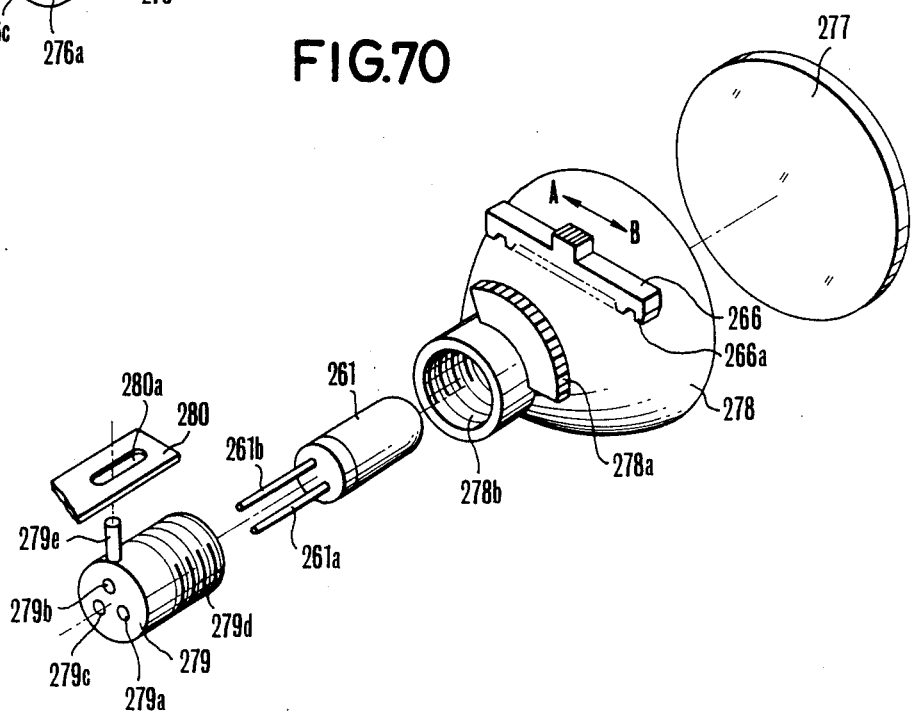
FIG. 70 is an exploded view showing a further modification example of the same flash unit.

FIG. 70 shows a further example of modification of the embodiment shown in FIG. 67. In FIG. 70, the same parts as those shown in FIG. 67 are indicated by the same reference numerals and the details of them are omitted from the following description: Referring to FIG. 70, a reflector 278 has a mounting hole in its bottom part with a female thread part 278b formed inside the hole. On the outer circumferential side of the reflector 278 is formed a gear part 278a which is arranged to engage the rack gear 266a of the change-over member 266. A holder 279 carries the flash tube 261 which is inserted in the holder. A male screw part 279d which is formed along the outer circumference of the holder 279 is arranged to engage the female thread part 278b of the reflector 278. A guide pin 279e is disposed behind the male screw part on the holder and is arranged to engage a slot 280a formed in a guide plate which is secured to the camera body (not shown). The holder 279 is thus arranged to be linearly movable back and forth relative to the reflector 278. The holder also includes the through holes 279a, 279b and 279c which are arranged in the same manner as in the case of the embodiment described in the foregoing. A protector 277 is secured to the front part of the reflector 278. Meanwhile, the reflector 278 has its peripheral part carried by the camera body in such a way as to be rotatable on the optical axis of the flash unit.

The modification is shown in FIG. 70 as in a half-frame size photographing mode. When the change-over member is moved in the direction of arrow A to switch the half-frame size mode over to the full-frame size mode, the reflector 278 is turned round 90 degrees counterclockwise on the flashing optical axis together with the protector 277. In this instance, since the holder 279 is prevented from turning round by the slot 280a of the guide plate 280 through its guide pin 279e, the holder 279 moves linearly forward relative to the reflector 278. The light distributing characteristic of the flash unit is thus changed from a characteristic for the half-frame size mode over to a characteristic for the full-frame size mode.

Unlike the three embodiments shown in FIGS. 67, 68 and 69, the embodiment shown in FIG. 70 is arranged, as mentioned above, to perform light distribution control by turning round the protector together with the reflector.

In the cases of FIGS. 67 to 70, the change-over member 266 is arranged, as obvious from the foregoing description, to be manually operated. In response to the manual change-over operation, a film feeding gear train and an aperture size, etc. arranged on the side of the camera are all shifted either to the full-frame size mode positions or to the half-frame size mode positions while the protector 263, etc. on the side of the flash unit are turned round for controlling the flash light distribution. However, these operations does not have to be accomplished by one and the same change-over or switching member but of course may be arranged to be accomplished by switching members which are discretely arranged.

Further, in addition to the arrangement to change the protector 263 from one position thereof over to another by the manual operation, the protector 263, etc. may be arranged to be turned round for the change-over in response to a change-over action performed for the film feeding gear train and an aperture size defining member as indicated in FIG. 68.

Further, the embodiments described are arranged to have the vertical light distribution and the lateral light distribution in the ratio of 1:1.5. However, in accordance with this invention, the ratio is not limited to that value.

In the embodiments described, the invention is applied to a so-called full/half change-over camera which is capable of selecting the size of photo taking picture plane from between the full frame size and the half frame size and more particularly to a camera which is not only of that type but also is incorporating an electronic flash unit using a miniature lamp type flash tube. In accordance with the invention, the ratio between the vertical flash light distribution and the lateral flash light distribution can be changed from 1:1.5 over to 1.5:1 by turning round the protector 90 degrees in response to change-over from the full-frame size mode to the half-frame size mode by utilizing the structural arrangement of the miniature lamp type electronic flash unit. In addition to that, the flash tube is arranged to be shiftable backward relative to the reflector for improved efficiency of flash light distribution. The illumination light from the flash tube, therefore, can be effectively used for both the full- and half-frame size photographing operations. It is another advantage of the invention that the flashing guide number can be increased for photographing in the half-frame size mode.

The invented structural arrangement of the electronic flash unit using a miniature lamp type flash tube, as described in the foregoing, eliminates the various problems which have resulted from the use of a straight tube type flash tube in the past; is capable of giving adequate light distributing characteristic in all the vertical and lateral directions; and permits reduction in size of the flash unit. The invention, therefore, has a very high degree of utility.

What is claimed is:
1. A flash device for a camera comprising:
 (a) a light transmissive sealed body having an opening at one end thereof;
 (b) sealing means for sealing the opening of said light transmissive sealed body;
 (c) cathode and anode electrodes provided on said sealing means and adapted to generate a light producing arc discharged therebetween over an arc discharge route;
 (d) partitioning means for expanding the art discharge route by dividing the inside of said sealed body into a plurality of chambers, and for causing light generated by said flash device to be substantially free of shadow; and
 (e) means for forming a trigger electrode and for securing said trigger electrode to said light transmissive sealed body wherein said means for forming and retaining comprises a trigger leaf spring.
2. A flash device for a camera, comprising:
 (a) a light transmissive sealed body having an opening at one end thereof;
 (b) sealing means for sealing the opening of said light transmissive sealed body;
 (c) cathode and anode electrodes provided on said sealing means and adapted to generate a light producing arc discharged therebetween over an arc discharge route;
 (d) partitioning means for expanding the arc discharge route by dividing the inside of said sealed body into a plurality of chambers; and
 (e) optical means for refracting light located a predetermined distance from an optical axis of the flash device and generated by the flash device to cause the light generated by said flash device to be substantially free of shadow caused by said partitioning means.
3. A flash device according to claim 2, wherein said partitioning means includes a plurality of intersecting partition means that approximately orthogonally intersect each other.
4. A flash device according to claim 3, wherein said cathode and anode electrodes are formed approximately on a center line passing through a center of said sealing means.
5. A flash device according to claim 2, wherein said cathode and anode electrodes are formed approximately on a center line passing through a center of said sealing means.
6. A flash device according to claim 2, wherein said partitioning means includes partition means formed in a helicoidal shape.
7. A flash device according to claim 2, wherein said partitioning means includes a transparent part.
8. A device according to claim 2, further comprising an elastic insulating partition provided between said cathode electrode and said anode electrode.
9. A device according to claim 2, further comprising means for changing the distance between said optical means and said sealed body in accordance with the size of a photographic screen.
10. A flash device according to claim 2, wherein said partitioning means comprises first and second parallel plates disposed orthogonally to a center line of said flash device.
11. A flash device according to claim 2, wherein said optical means comprises means for refracting the generated light in a peripheral direction relative to the optical axis of the flash device.
12. A flash device according to claim 2, further comprising means for forming a trigger electrode and retaining for said trigger electrode to said light transmissive sealed body.
13. A flash device according to claim 12, wherein said means for forming and retaining comprises a trigger leaf spring.
14. A flash device for a camera comprising:
 (a) a light transmissive sealed body having an opening at one end thereof;
 (b) sealing means for sealing the opening of said light transmissive sealed body;
 (c) cathode and anode electrodes provided on said sealing means and adapted to generate a light by electric discharge therebetween over an electric discharge route;
 (d) partitioning means for expanding the electric discharged route by dividing the inside of said sealed body into a plurality of chambers; and
 (e) optical means for refracting the light so as to make the projected light of said flash device substantially free of shadow caused by said partitioning means.
15. A flash device according to claim 14, wherein said partitioning means includes a plurality of intersecting partition means that approximately orthogonally intersect each other.

16. A flash device according to claim 14, wherein said cathode and anode electrodes are formed approximately on a center line passing through a center of said sealing means.

17. A flash device according to claim 15, wherein said cathode and anode electrodes are formed approximately on a center line passing through a center of said sealing means.

18. A flash device according to claim 14, wherein said partitioning means includes partition means formed in a helicoidal shape.

19. A flash device according to claim 14, wherein said partitioning means includes a transparent part.

20. A device according to claim 14, further comprising an elastic insulating partition provided between said cathode electrode and said anode electrode.

21. A device according to claim 14, further comprising means for changing the distance between said optical means and said sealed body in accordance with the size of a photographic screen.

22. A flash device according to claim 14, wherein said partitioning means comprises first and second parallel plates disposed orthogonal to a center line of said flash device.

23. A flash device according to claim 14, wherein said optical means comprises means for refracting the generated light in a peripheral direction relative to the optical axis of the flash device.

24. A flash device according to claim 14, further comprising means for forming a trigger electrode and for securing said trigger electrode to said light transmissive sealed body.

25. A flash device according to claim 24, wherein said means for forming and securing comprises a trigger leaf spring.

* * * * *

UNITED STATES PATENT AND TRADEMARK OFFICE
CERTIFICATE OF CORRECTION

PATENT NO. : 4,941,070
DATED : July 10, 1990
INVENTOR(S) : Yukio Ogawa, et al.

It is certified that error appears in the above-identified patent and that said Letters Patent is hereby corrected as shown below:

COVER PAGE

Between items [30] and [22] insert,

--[60] Related U.S. Application Data:

Continuation of Ser. No. 084,106, August 11, 1987, now abandoned.--

COLUMN 1:

Line 27, "the the" should read --the--.

COLUMN 2:

Line 49, "FIG. 25." should read --FIG. 23.--.

COLUMN 3:

Line 64, "EMBODIMENT" should read --EMBODIMENTS--.

COLUMN 4:

Line 36, "of" should be deleted.

UNITED STATES PATENT AND TRADEMARK OFFICE
CERTIFICATE OF CORRECTION

PATENT NO. : 4,941,070
DATED : July 10, 1990
INVENTOR(S) : Yukio Ogawa, et al.

It is certified that error appears in the above-identified patent and that said Letters Patent is hereby corrected as shown below:

COLUMN 11:

Line 11, "is" should read --are--.

Line 12, "is" should read --are--.

Line 29, "precisely" should read --is precisely--.

Line 34, "allows" should read --allow--.

Line 55, "inserted" should read --to be inserted--.

COLUMN 13:

Line 66, "of of" should read --of--.

COLUMN 14:

Line 48, "the the" should read --the--.

COLUMN 15:

Line 13, "is" should read --are--.

COLUMN 16:

Line 4, "is" should read --are--.

UNITED STATES PATENT AND TRADEMARK OFFICE
CERTIFICATE OF CORRECTION

PATENT NO. : 4,941,070

DATED : July 10, 1990

INVENTOR(S) : Yukio Ogawa, et al.

Page 3 of 5

It is certified that error appears in the above-identified patent and that said Letters Patent is hereby corrected as shown below:

COLUMN 17:

Line 4, "The" should read --the--.

COLUMN 18:

Line 37, "is" should read --are--.

COLUMN 21:

Line 14, "is" should read --are--.

Line 36, "bamboo-shoot like" should read --bamboo-shootlike--.

COLUMN 22:

Line 67, "of" should be deleted.

COLUMN 25:

Line 44, "a" should read --the--.

UNITED STATES PATENT AND TRADEMARK OFFICE
CERTIFICATE OF CORRECTION

PATENT NO. : 4,941,070

DATED : July 10, 1990

INVENTOR(S) : Yukio Ogawa, et al.

It is certified that error appears in the above-identified patent and that said Letters Patent is hereby corrected as shown below:

COLUMN 26:

Line 15, "female thread part" should read --female thread part 265b--.

Line 55, "move" should read --moves--.

COLUMN 27:

Line 54, "level." should read --lever.--.

COLUMN 28:

Line 1, "the the" should read --the--.

Line 61, "does" should read --do--.

COLUMN 29:

Line 51, "art discharge" should read --arc discharge--.

UNITED STATES PATENT AND TRADEMARK OFFICE
CERTIFICATE OF CORRECTION

PATENT NO. : 4,941,070

DATED : July 10, 1990

INVENTOR(S) : Yukio Ogawa, et al.

It is certified that error appears in the above-identified patent and that said Letters Patent is hereby corrected as shown below:

<u>COLUMN 30</u>:

Line 36, "orthogonally" should read --orthogonal--.

Line 43, "and retain-" should read --and for retain- --.

Line 44, "for" should be deleted.

Line 60, "charged" should read --charge--.

Signed and Sealed this

Fifteenth Day of December, 1992

Attest:

DOUGLAS B. COMER

Attesting Officer

Acting Commissioner of Patents and Trademarks